United States Patent
Sasai et al.

(10) Patent No.: US 12,101,491 B2
(45) Date of Patent: *Sep. 24, 2024

(54) ENCODING METHOD, DECODING METHOD, ENCODING APPARATUS, AND DECODING APPARATUS

(71) Applicant: Sun Patent Trust, New York, NY (US)

(72) Inventors: Hisao Sasai, Kanagawa (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,384

(22) Filed: Aug. 14, 2023

(65) Prior Publication Data

US 2023/0388521 A1 Nov. 30, 2023

Related U.S. Application Data

(63) Continuation of application No. 17/749,408, filed on May 20, 2022, now Pat. No. 11,765,364, which is a (Continued)

(51) Int. Cl.
*H04N 19/174* (2014.01)
*H04N 19/117* (2014.01)
(Continued)

(52) U.S. Cl.
CPC ......... *H04N 19/174* (2014.11); *H04N 19/117* (2014.11); *H04N 19/127* (2014.11);
(Continued)

(58) Field of Classification Search
None
See application file for complete search history.

(56) References Cited

U.S. PATENT DOCUMENTS

| | | |
|---|---|---|
| 7,724,818 B2 | 5/2010 | Hannuksela |
| 8,238,435 B2 | 8/2012 | Taylor |
| | (Continued) | |

FOREIGN PATENT DOCUMENTS

| | | |
|---|---|---|
| CN | 1738429 | 2/2006 |
| CN | 101610416 | 12/2009 |
| | (Continued) | |

OTHER PUBLICATIONS

Schwarz H, Schierl T, Marpe D. Block structures and parallelism features in HEVC. High Efficiency Video Coding (HEVC) Algorithms and Architectures. 2014:49-90. (Year: 2014).*

(Continued)

*Primary Examiner* — Michelle M Entezari Hausmann
(74) *Attorney, Agent, or Firm* — Wenderoth, Lind & Ponack, L.L.P.

(57) ABSTRACT

An image encoding method including: a constraint information generating step of generating tile constraint information indicating whether or not there is a constraint in filtering on boundaries between adjacent tiles among a plurality of tiles obtained by dividing a picture, and storing the tile constraint information into a sequence parameter set; and a filter information generating step of generating, for each of the boundaries, one of a plurality of filter information items respectively indicating whether or not filtering is executed on the boundaries, and storing the plurality of filter information items into a plurality of picture parameter sets, wherein, in the filter information generating step, the plurality of filter information items which indicate identical
(Continued)

content are generated when the tile constraint information indicates that there is the constraint in the filtering.

2 Claims, 31 Drawing Sheets

Related U.S. Application Data continuation of application No. 16/880,199, filed on May 21, 2020, now Pat. No. 11,375,210, which is a continuation of application No. 16/232,520, filed on Dec. 26, 2018, now Pat. No. 10,701,372, which is a continuation of application No. 15/681,650, filed on Aug. 21, 2017, now Pat. No. 10,212,431, which is a continuation of application No. 14/338,417, filed on Jul. 23, 2014, now Pat. No. 9,774,870, which is a continuation of application No. PCT/JP2013/000351, filed on Jan. 24, 2013.

(60) Provisional application No. 61/591,409, filed on Jan. 27, 2012.

(51) Int. Cl.
*H04N 19/127* (2014.01)
*H04N 19/436* (2014.01)
*H04N 19/44* (2014.01)
*H04N 19/463* (2014.01)
*H04N 19/70* (2014.01)

(52) U.S. Cl.
CPC ......... *H04N 19/436* (2014.11); *H04N 19/44* (2014.11); *H04N 19/463* (2014.11); *H04N 19/70* (2014.11)

(56) References Cited

U.S. PATENT DOCUMENTS

| | | |
|---|---|---|
| 8,654,860 B2 | 2/2014 | Huang |
| 8,948,243 B2 | 2/2015 | Sekiguchi |
| 9,001,883 B2 | 4/2015 | Tsai |
| 9,060,174 B2 | 6/2015 | Horowitz |
| 9,123,130 B2 | 9/2015 | Sato |
| 9,185,404 B2 | 11/2015 | Van der Auwera |
| 9,210,443 B2 | 12/2015 | Dachiku |
| 9,247,258 B2 | 1/2016 | Coban |
| 9,247,260 B1 | 1/2016 | Swenson |
| 9,270,987 B2 | 2/2016 | Sato |
| 9,294,776 B2 | 3/2016 | Rapaka |
| 9,369,722 B2 | 6/2016 | Horowitz |
| 9,560,367 B2 | 1/2017 | Wang |
| 9,578,328 B2 | 2/2017 | Rapaka |
| 9,628,792 B2 | 4/2017 | Rapaka |
| 9,648,328 B2 | 5/2017 | Komiya |
| 9,819,966 B2 | 11/2017 | Chong |
| 9,967,576 B2 | 5/2018 | Lee |
| 9,979,974 B2 | 5/2018 | Lee |
| 10,728,521 B2 | 7/2020 | Hannuksela |
| 11,159,811 B2 | 10/2021 | Choi |
| 11,159,822 B2 | 10/2021 | Coban |
| 2003/0206228 A1 | 11/2003 | Trevers |
| 2004/0032908 A1 | 2/2004 | Hagai et al. |
| 2004/0184666 A1 | 9/2004 | Sekiguchi |
| 2006/0104349 A1 | 5/2006 | Joch |
| 2006/0188017 A1 | 8/2006 | Hagai et al. |
| 2006/0239350 A1 | 10/2006 | Hagai et al. |
| 2006/0239351 A1 | 10/2006 | Hagai et al. |
| 2006/0239352 A1 | 10/2006 | Hagai et al. |
| 2008/0069210 A1 | 3/2008 | Hagai et al. |
| 2008/0225956 A1 | 9/2008 | Kusakabe |
| 2008/0240252 A1 | 10/2008 | He |
| 2008/0310500 A1* | 12/2008 | Winger ............... H04N 21/235 375/E7.199 |
| 2009/0103614 A1 | 4/2009 | Hagai et al. |
| 2009/0232208 A1 | 9/2009 | Lee |
| 2009/0257664 A1* | 10/2009 | Kao ..................... H04N 19/126 382/232 |
| 2009/0316793 A1 | 12/2009 | Yang et al. |
| 2010/0111193 A1 | 5/2010 | Pandit |
| 2011/0200100 A1 | 8/2011 | Kim |
| 2012/0163452 A1 | 6/2012 | Horowitz |
| 2012/0207227 A1 | 8/2012 | Tsai |
| 2012/0213276 A1 | 8/2012 | Hagai et al. |
| 2012/0230594 A1 | 9/2012 | Boyce |
| 2013/0003827 A1 | 1/2013 | Misra |
| 2013/0003829 A1 | 1/2013 | Misra |
| 2013/0003864 A1 | 1/2013 | Sullivan |
| 2013/0016786 A1 | 1/2013 | Segall |
| 2013/0107973 A1 | 5/2013 | Wang |
| 2013/0272405 A1 | 10/2013 | Jeon |
| 2014/0198844 A1 | 7/2014 | Hsu |
| 2014/0247875 A1 | 9/2014 | Hattori et al. |

FOREIGN PATENT DOCUMENTS

| | | |
|---|---|---|
| JP | 2018-532318 | 11/2018 |
| WO | 2013/063455 | 5/2013 |
| WO | 2013/065673 | 5/2013 |
| WO | 2013/158019 | 10/2013 |

OTHER PUBLICATIONS

Flynn, David, et al. "Overview of the range extensions for the HEVC standard: Tools, profiles, and performance." IEEE Transactions on Circuits and Systems for Video Technology 26.1 (2015): 4-19. (Year: 2015).*
Schierl T, Hannuksela MM, Wang YK, Wenger S. System layer integration of high efficiency video coding. IEEE Transactions on circuits and Systems for Video Technology. Oct. 5, 2012;22(12):1871-84. (Year: 2012).*
Ugur K, Andersson K, Fuldseth A, Bjontegaard G, Endresen LP, Lainema J, Hallapuro A, Ridge J, Rusanovskyy D, Zhang C, Norkin A. High performance, low complexity video coding and the emerging HEVC standard. IEEE Transactions on Circuits and Systems for Video Technology. Nov. 18, 2010;20(12):1688-97. (Year: 2010).*
International Search Report issued Apr. 9, 2013 in International (PCT) Application No. PCT/JP2013/000351 .
International Search Report issued Jul. 23, 2013 in International (PCT) Application No. PCT/JP2013/002681.
ISO/IEC 14496-10 Information technology—Coding of audio-visual objects—Part 10:Advanced Video Coding, Second edition, Oct. 1, 2004.
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d1, 7th Meeting: Geneva, CH, Nov. 21-30, 2011, http://phenix.it-sudparis.eu/jct/doc_end_user/documents/7_Geneva/wg11/JCTVC-G1103-v2.zip.
Ye-Kui Wang et al., "Dependency and loop filtering control over tile boundaries", Joint Collaborative Team on Video Coding (JCT-VC) of ITU-T SG16 WP3 and ISO/IEC JTC1/SC29/WG11, JCTVC-G317, 7th Meeting: Geneva, CH, Nov. 21-30, 2011.
Chia-Yang Tsai et al., "AHG4: Non-cross-tiles loop filtering for independent tiles", Joint Collaborative Team on Video Coding (JCT-VC) of ITU-T SG16 WP3 and ISO/IEC JTC1/SC29/WG11, JCTVC-G194, 7th Meeting: Geneva, CH, Nov. 21-30, 2011.
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d7, Ver10, 7th Meeting: Geneva, CH, Nov. 21-30, 2011.
Rickard Sjoberg et al., "AHG4: Enabling decoder parallelism with tiles", Joint Collaborative Team on Video Coding (JCT-VC) of ITU-T SG16 WP3 and ISO/IEC JTC1/SC29/WG11, JCTVC-I0233, 9th Meeting: Geneva, CH, Apr. 17, 2012, pp. 1-14.
Muhammed Coban et al., "Tile entry point signalling", Joint Collaborative Team on Video Coding (JCT-VC) of ITU-T SG16 WP3 and ISO/IEC JTC1/SC29/WG11, JCTVC-I0357, 9th Meeting: Geneva, CH, Apr. 17, 2012, pp. 1-4.

(56) References Cited

OTHER PUBLICATIONS

Kiran Misra et al., "Harmonization of Entry Points for Tiles and Wavefront Processing", Joint Collaborative Team on Video Coding (JCT-VC) of ITU-T SG16 WP3 and ISO/IEC JTC1/SC29/WG11, JCTVC-G722-r1, 7th Meeting: Geneva, CH, Nov. 2011, pp. 1-4.
Kiran Misra et al., "New results for parallel decoding for Tiles", Joint Collaborative Team on Video Coding (JCT-VC) of ITU-T SG16 WP3 and ISO/IEC JTC1/SC29/WG11, JCTVC-F594-r1, 6th Meeting: Trino, IT, Jul. 2011, pp. 1-6.
Arild Fuldseth et al., "Tiles", Joint Collaborative Team on Video Coding (JCT-VC) of ITU-T SG16 WP3 and ISO/IEC JTC1/SC29/WG11, JCTVC-E408-r1, 5th Meeting: Geneva, CH, Mar. 2011, pp. 1-14.
Benjamin Bross et al., "High Efficiency Video Coding (HEVC) text specification draft 6", Joint Collaborative Team on Video Coding (JCT-VC) of ITU-T SG16 WP3 and ISO/IEC JTCI/SC29/WG11 8th Meeting: San Jose, CA, USA, Feb. 1-10, 2012, ver. 22, JCTVC-H1003.
Extended European Search Report issued Apr. 7, 2015 in European Application No. 13784565.7.
Kiran Misra et al., "Harmonization of Entry Points for Tiles and Wavefront Processing", Joint Collaborative Team on Video Coding (JCT-VC) of ITU-T SG16 WP3 and ISO/IEC JTC1/SC29/WG11, JCTVC-G722, 7th Meeting: Geneva, CH, Nov. 21-30, 2011, XP030110706.
Arild Fuldseth et al., "Tiles", Joint Collaborative Team on Video Coding (JCT-VC) of ITU-T SG16 WP3 and ISO/IEC JTC1/SC29/WG11, JCTVC-E408, 5th Meeting: Geneva, CH, Mar. 16-23, 2011, XP030008914.
Benjamin Bross et al., "High-Efficiency Video Coding (HEVC) text specification draft 6", Joint Collaborative Team on Video Coding (JCT-VC), JCTVC-H1003_d0, 7th Meeting: Geneva, CH, Nov. 21-30, 2011, XP 030111769.
Hisao Sasai et al., Constrained Tile for parallel decoding, Joint Collaborative Team on Video Coding (JCT-VC) of ITU-TSG16 WP3 and ISO/IEC JTCI/SC29/WG11 8th Meeting: San Jose, CA, USA, Feb. 1-10, 2012, JCTVCH0345, URL,http://phenix.it-sudparis.eu/jct/doc_end_user/documents/8_San%20Jose/wg11/JCTVC-H0345-v1.zip (Jan. 20, 2012).
Kazuo Sugimoto et al., Parallel processing of ALF and SAO for tiles, Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G454, URL,http://phenix.it-sudparis.eu/jct/doc_end_user/documents/7_Geneva/wg11/JCTVC-G454-v4.zip (Nov. 26, 2011).
Office Action issued Dec. 28, 2016 in Chinese Application No. 201380006479.3, with partial English translation.
Chia-Yang Tsai et al., "Slice Boundary Processing and Picture Layer Raw Byte Sequence Payload", Joint Collaborative Team on Video Coding (JCT-VC) of ITU-T SG16 WP3 and ISO/IEC JTC1/SC29/WG11, JCTVC-D128, 4th Meeting: Daegu, KR, Jan. 20-28, 2011.
Office Action issued Jul. 19, 2016 in U.S. Appl. No. 14/338,417.
Office Action issued Jan. 3, 2017 in U.S. Appl. No. 14/338,417.
Notice of Allowance issued May 19, 2017 in U.S. Appl. No. 14/338,417.
Sullivan, Gary J., et al. "Overview of the high efficiency video coding (HEVC) standard." IEEE Transactions on circuits and systems for video technology 22.12 (2012): 1649-1668. (Year: 2012).
Sjoberg, Rickard, et al. "Overview of HEVC high-level syntax and reference picture management." IEEE transactions on Circuits and Systems for Video Technology 22.12 (2012): 1858-1870. (Year: 2012).
Wien, M., 2015. Coding Structures. In High Efficiency Video Coding (pp. 101-132). Springer, Berlin, Heidelberg. (Year: 2015).
Sullivan, Gary J., and Thomas Wiegand, "Video compression-from concepts to the H.264/AVC standard," Proceedings of the IEEE 93.1 (2005): 18-31. (Year: 2005).
Hannuksela, Miska M., Ye-Kui Wang, and Moncef Gabbouj. "Isolated regions in video coding. " IEEE Transactions on Multimedia 6.2 (2004): 259-267 (Year: 2004).

* cited by examiner

Tile boundary

FIG. 6
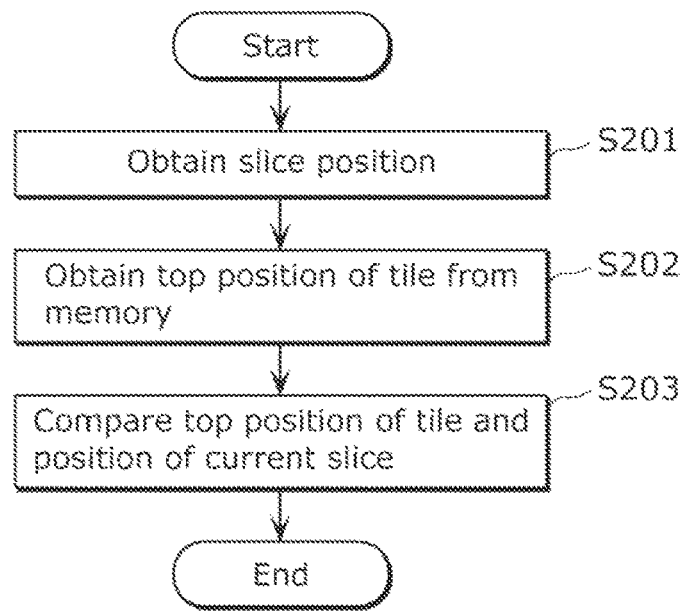
FIG. 7
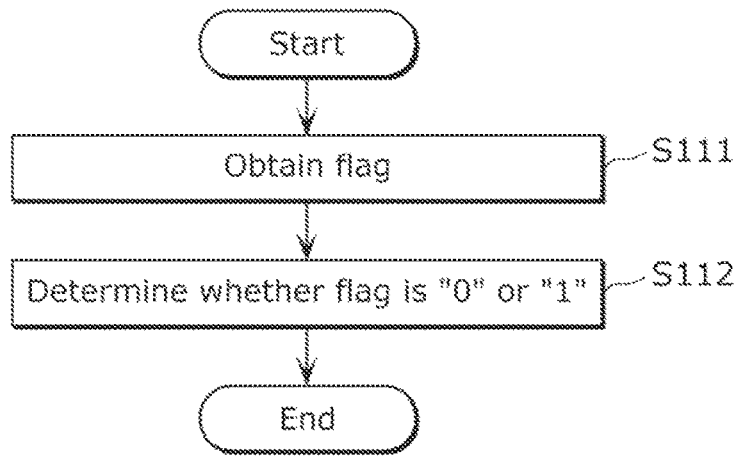
FIG. 8
| slice_header( ) { | Descriptor |
|---|---|
| start_tile_in_slice_flag | u(1) |
| entropy_slice_flag | u(1) |
| ... | |
| } | |

FIG. 16

Sequence parameter set RBSP syntax

| seq_parameter_set_rbsp( ) { | Descriptor |
|---|---|
| profile_idc | u(8) |
| reserved_zero_8bits/* equal to 0/* | u(8) |
| level_idc | u(8) |
| ... | |
| constraint_tile | u(1) |
| ... | |
| tile_boundary_independence_flag | u(1) |
| if ( tile_boundary_independence_flag==1) | |
| loop_filter_across_tile_flag | u(1) |
| loop_filter_across_slice_flag | u(1) |
| ... | |

FIG. 17

Picture parameter set RBSP syntax

| pic_parameter_set_rbsp( ) { | Descriptor |
|---|---|
| ... | |
| | |
| slice_granularity | u(2) |
| ... | |
| tile_info_present_flag | u(1) |
| | |
| if( tile_info_present_flag ) { | |
| tile_boundary_independence_flag | u(1) |
| if ( tile_boundary_independence_flag==1) | |
| loop_filter_across_tile_flag | u(1) |
| ... | |
| } | |
| } | |

| SPS | pcm_loop_filter_disable_flag |
| PPS | constrained_intra_pred_flag |
| PPS | slice_granularity |

| slice_header() { | Descriptor |
|---|---|
| first_slice_in_pic_flag | u(1) |
| if( first_slice_in_pic_flag==0) | |
| slice_address | u(v) |
| ... | |

| slice_header( ) { | Descriptor |
|---|---|
| first_slice_in_pic_flag | u(1) |
| if( first_slice_in_pic_flag==0) | |
| start_tile_in_slice_flag | u(1) |
| if( start_tile_in_slice_flag==1) | |
| tile_idx_minus_1 | u(v) |
| else | |
| slice_address | u(v) |
| ... | |

FIG. 31

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 42
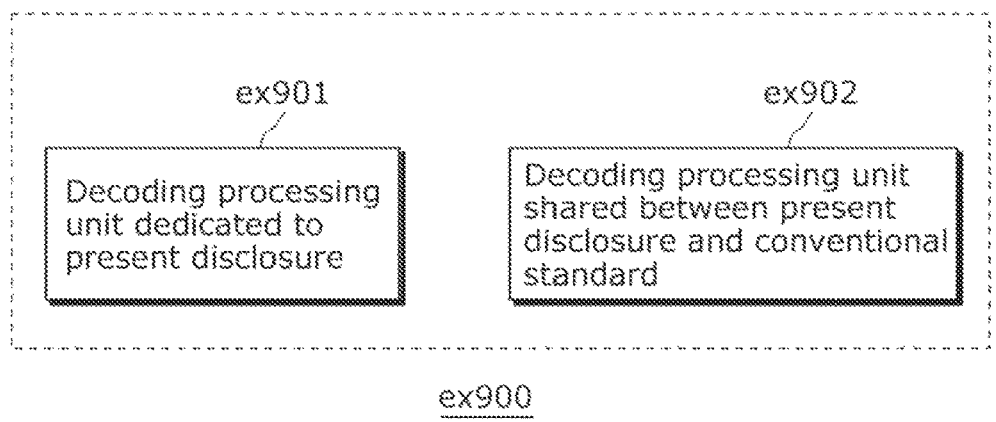
FIG. 43A
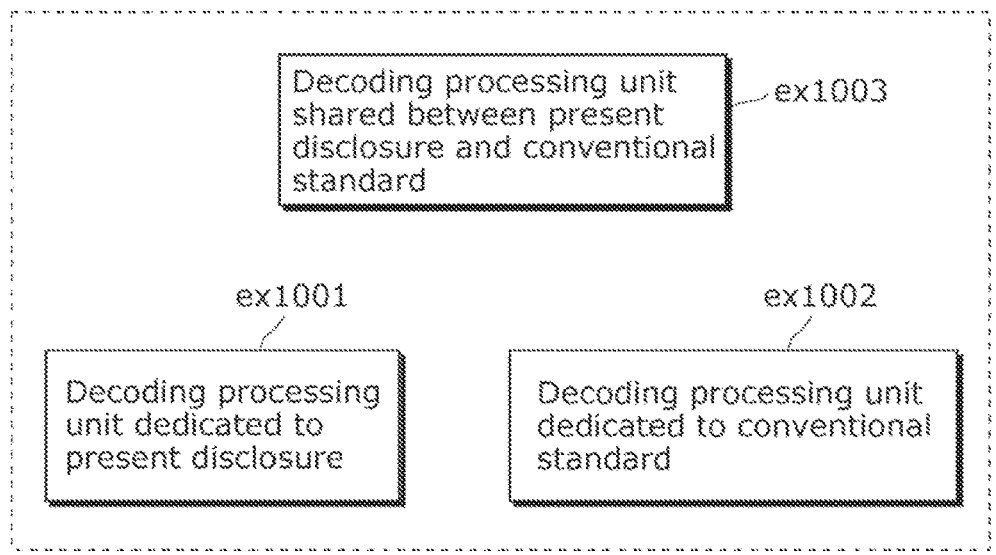
FIG. 43B

ENCODING METHOD, DECODING METHOD, ENCODING APPARATUS, AND DECODING APPARATUS

FIELD

One or more exemplary embodiments disclosed herein relate generally to an image encoding method and an image decoding method.

BACKGROUND

As conventional image encoding methods, the ITU-T Standards called H.26x or the ISO/IEC standards called MPEG-x have been known (for example, see Non Patent Literature 1).

Furthermore, as a new standard, the High Efficiency Video Coding (HEVC) method (for example, see Non Patent Literature 2) has been considered.

CITATION LIST

Non Patent Literature

NPL 1
ISO/IEC 14496-10 "MPEG-4 Part 10 Advanced VIDEO Coding"
NPL 2
Joint Collaborative Team on Video Coding (JCT-VC) of ITU-T SG16 WP3 and ISO/IEC JTC1/SC29/WG11 7th Meeting: Geneva, CH, —21-30 Nov. 2011, JCTVC-G1103, "Working Draft 5 of High Efficiency Video coding", http://phenix.itsudparis.eu/jct/doc_end_user/documents/7_Geneva/w g11/JCTVC-G1103-v2.zip

SUMMARY

Technical Problem

In this way, in such image encoding method and decoding method, an image is divided into a plurality of areas, and the areas obtained through the division are subjected to parallel processing.

In view of this, one non-limiting and exemplary embodiment provides an image encoding method and an image decoding method for easily realizing parallel processing.

Solution to Problem

In one general aspect, the techniques disclosed here feature an image encoding method including: a constraint information generating step of generating tile constraint information indicating whether or not there is a constraint in filtering on boundaries between adjacent tiles among a plurality of tiles obtained by dividing a picture, and storing the tile constraint information into a sequence parameter set; and a filter information generating step of generating, for each of the boundaries, one of a plurality of filter information items respectively indicating whether or not filtering is executed on the boundaries, and storing the plurality of filter information items into a plurality of picture parameter sets, wherein, in the filter information generating step, the plurality of filter information items which indicate identical content are generated when the tile constraint information indicates that there is the constraint in the filtering.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image encoding method and an image decoding method according to one or more exemplary embodiments or features disclosed herein easily realize parallel processing.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a flowchart of determination processes according to a comparison example with respect to Embodiment 1 disclosed herein.

FIG. 7 is a flowchart of determination processes according to Embodiment 1.

FIG. 8 is a diagram illustrating a syntax of a slice header according to Embodiment 1.

FIG. 16 is a diagram illustrating a syntax of a sequence parameter set according to Embodiment 3.

FIG. 17 is a diagram illustrating a syntax of a sequence parameter set according to Embodiment 3.

FIG. 31 illustrates a structure of multiplexed data.

FIG. 42 shows an example of a look-up table in which video data standards are associated with driving frequencies.

FIG. 43A is a diagram showing an example of a configuration for sharing a module of a signal processing unit.

FIG. 43B is a diagram showing another example of a configuration for sharing a module of the signal processing unit.

DESCRIPTION OF EMBODIMENTS (Underlying Knowledge Forming Basis of the Present Disclosure)

In relation to the conventional technique disclosed in the Background section, the inventors have found the problem below.

Figure 1:
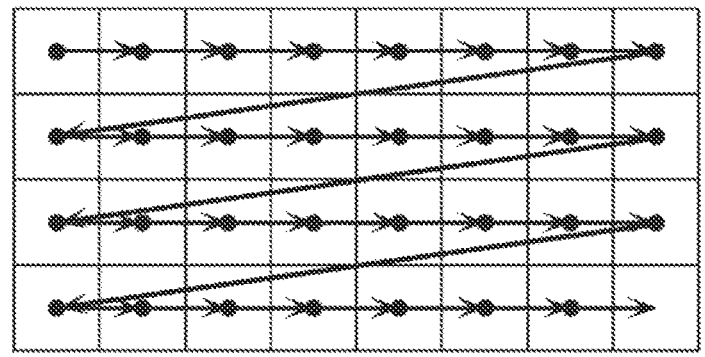
FIG. 1 is a diagram illustrating an example of a scan order according to an embodiment disclosed herein.

In the ITU-T Standards called as H.26x or the ISO/IEC standards called MPEG-x, signals of an image is processed in a raster scan order illustrated in FIG. 1. In addition, the image is divided into a plurality of units called slices. The respective slices include signals which are serial in the raster scan order. Encoding is performed in units of a slice.

Figure 2:
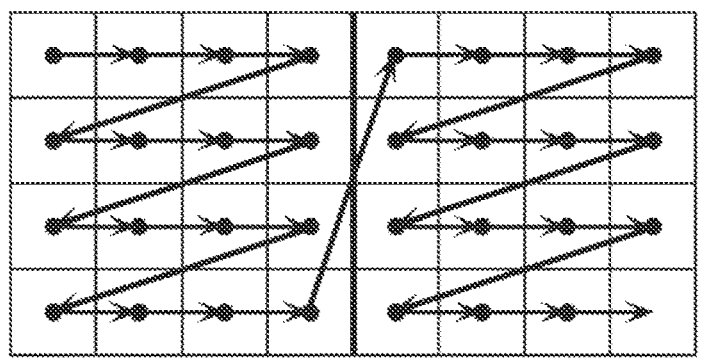
FIG. 2 is a diagram illustrating an example of a scan order according to an embodiment disclosed herein.

In addition, in the HEVC method, a tile method is also considered. In the tile method, an image is divided into a plurality of rectangular units (tiles). Signals included in the respective rectangles are processed in the raster scan order on a per resulting rectangle basis (see FIG. 2). The tile method makes it possible to divide an image in the vertical direction, to thereby reduce a line memory.

Figure 3:
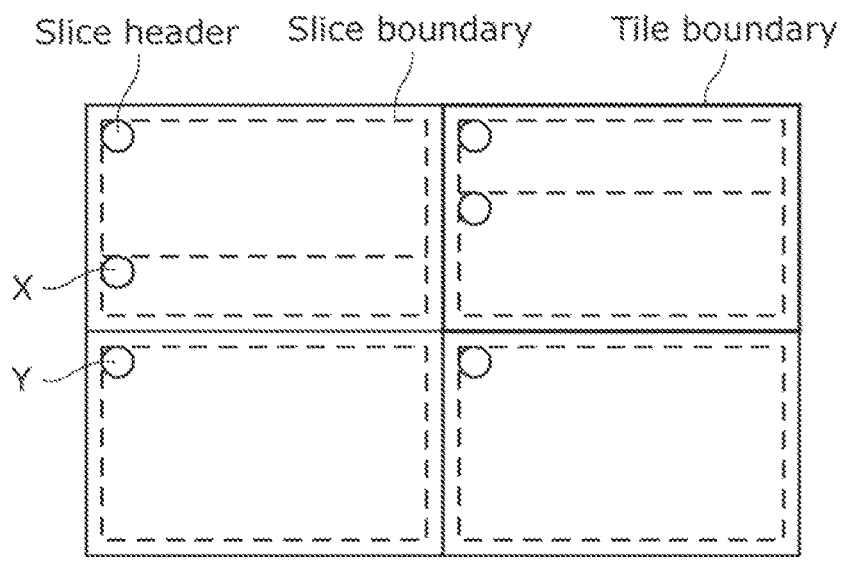
FIG. 3 is a diagram illustrating an example of tiles and slices obtained by diving an image according to an embodiment disclosed herein.
Figure 4:
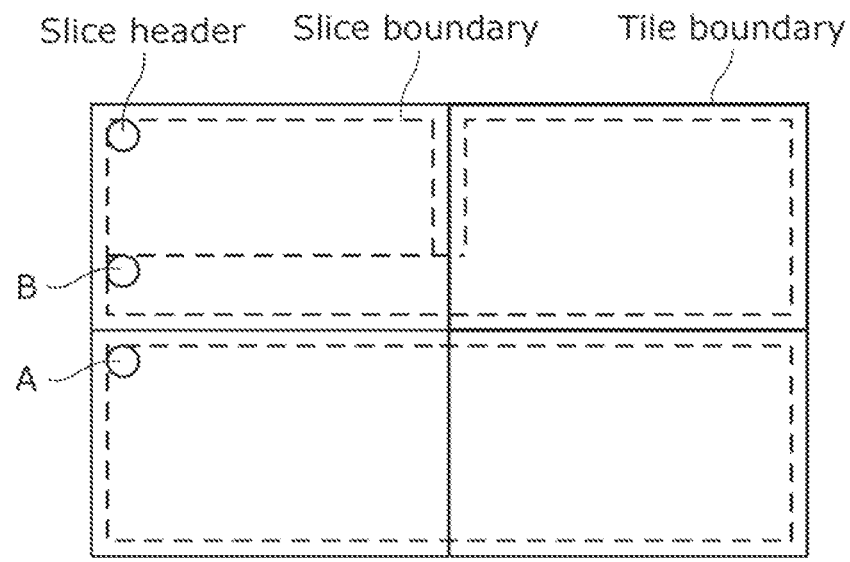
FIG. 4 is a diagram illustrating an example of tiles and slices obtained by dividing an image according to an embodiment disclosed herein.

For example, in the example illustrated in FIG. 3, the portions enclosed by solid lines show tiles, and the portions enclosed by dotted lines show slices obtainable by dividing the tiles. FIG. 3 illustrates an example in which tile boundaries do not extend beyond any of slice boundaries. However, as shown in FIG. 4, a tile boundary may pass through a slice.

However, the inventors have found that the above-described method has a problem, when executing parallel processing on tile areas obtained by dividing an image, that it is difficult to find the top portions of the tile areas which are the targets in parallel processing.

More specifically, a pre-process is required to determine whether or not the image decoding apparatus can execute parallel processing (parallel decoding) on a decoding target bitstream. This pre-process increases processing time, which makes it difficult to realize high-speed processing. This pre-process otherwise necessitates increase in a circuit scale.

This embodiment describes an image decoding apparatus capable of executing parallel decoding, and determining whether or not a decoding target bitstream is a stream which can be processed in parallel decoding, or when the stream can be processed in the parallel decoding, quickly determining a point at which parallel decoding processes can be executed separately.

The image encoding method according to an embodiment includes: a constraint information generating step of generating tile constraint information indicating whether or not there is any constraint in the filtering on a plurality of tiles obtained by diving a picture, and encoding the tile constraint information; and when the tile constraint information indicates that there is a constraint in the filtering, determining whether or not filtering is executed on the boundaries between the plurality of tiles, based on a filter information item indicating whether or not filtering is executed on one of the boundaries between the plurality of tiles.

In this way, it is possible to suppress a switch between execution or non-execution of filtering on a per tile boundary basis. In this way, the image encoding method facilitates parallel processing.

For example, in the constraint information generating step, tile constraint information may be generated for each picture, or tile constraint information for each picture may be encoded.

For example, the image encoding method may further include an encoding step of encoding a filter information item indicating whether or not filtering is executed on a tile boundary among a plurality of tile boundaries when the tile constraint information indicates that there is the constraint in the filtering, and skipping encoding information indicating whether or not filtering is executed on the tile boundaries other than the tile boundary.

For example, the image encoding method may further include an encoding step of encoding filter information items indicating identical content, in association with the plurality of respective tile boundaries, when the tile constraint information indicates that there is the constraint.

In addition, the image encoding method according to an embodiment includes: a constraint information decoding step of decoding tile constraint information indicating whether or not there is any constraint in the filtering on a plurality of tiles obtained by dividing a picture, and, when the tile constraint information indicates that there is a constraint, determining whether or not filtering is executed on the boundaries between the plurality of tiles, based on a filter information item indicating whether or not filtering is executed on one of the boundaries between the plurality of tiles.

In this way, it is possible to suppress a switch between execution or non-execution of filtering on a per tile boundary basis. In this way, the image decoding method facilitates parallel processing.

For example, in the constraint information decoding step, the tile constraint information provided for each picture may be decoded.

For example, the image decoding method may further include a decoding step of decoding a filter information item indicating whether or not filtering is executed on a tile boundary among a plurality of tile boundaries when the tile constraint information indicates that there is the constraint, and skipping decoding information indicating whether or not filtering is executed on the tile boundaries other than the tile boundary.

For example, the image decoding method may further include a decoding step of decoding a plurality of filter information items indicating identical content and associated respectively with the plurality of tile boundaries, when the tile constraint information indicates that there is the constraint in the filtering.

In addition, an image encoding apparatus according to an embodiment includes: an encoding unit which generates tile constraint information indicating whether or not there is any constraint in the filtering on a plurality of tiles obtained by dividing a picture, and encoding the tile constraint information; and a determining unit which determines whether or not filtering is executed on the plurality of tile boundaries, based on a filter information item indicating whether or not filtering is executed on a tile boundary among the plurality of tile boundaries, when the tile constraint information indicates that there is a constraint in the filtering.

With this structure, it is possible to suppress a switch between execution or non-execution of filtering on a per tile boundary basis. In this way, the image encoding apparatus facilitates parallel processing.

In addition, an image decoding apparatus according to an embodiment includes: a decoding unit which decodes tile constraint information indicating whether or not there is any constraint in the filtering on a plurality of tiles obtained by dividing a picture; and a determining unit which determines whether or not filtering is executed on the plurality of tile boundaries, based on a filter information item indicating whether or not filtering is executed on a tile boundary among the plurality of tile boundaries, when the tile constraint information indicates that there is a constraint in the filtering.

With this structure, it is possible to suppress a switch between execution or non-execution of filtering on a per tile boundary basis. In this way, the image decoding apparatus facilitates parallel processing.

In addition, an image encoding and decoding apparatus according to an embodiment includes the image encoding apparatus and the image decoding apparatus.

In addition, an image encoding method according to an aspect of the present disclosure is an image encoding method including: a constraint information generating step of generating tile constraint information indicating whether or not there is a constraint in filtering on boundaries between adjacent tiles among a plurality of tiles obtained by dividing a picture, and storing the tile constraint information into a sequence parameter set; and a filter information generating step of generating, for each of the boundaries, one of a plurality of filter information items respectively indicating whether or not filtering is executed on the boundaries, and storing the plurality of filter information items into a plurality of picture parameter sets, wherein, in the filter information generating step, the plurality of filter information items which indicate identical content are generated when the tile constraint information indicates that there is the constraint in the filtering.

In addition, an image encoding method according to an aspect of the present disclosure is an image decoding method of decoding a stream generated using the image encoding method, the image decoding method including: a first obtaining step of obtaining the sequence parameter set from the stream; a second obtaining step of obtaining the tile constraint information included in the sequence parameter set; and a determining step of determining whether filtering is executed on all of the boundaries in a plurality of the picture or filtering is not executed on the boundaries, when the tile constraint information indicates that there is the constraint in the filtering.

For example, the image decoding method may further include following steps performed when the tile constraint information indicates that there is the constraint in the filtering: a third obtaining step of obtaining one of the plurality of picture parameter sets from the stream; and a fourth obtaining step of obtaining, from the one of the plurality of picture parameter sets, at least one filter information item among the plurality of filter information items, wherein, in the determining step, whether filtering is executed on all of the boundaries in a plurality of the picture or filtering is not executed on the boundaries is determined based on the at least one filter information item, when the tile constraint information indicates that there is the constraint in the filtering.

For example, in the fourth obtaining step, the one of the plurality of filter information items may be obtained when the tile constraint information indicates that there is the constraint in the filtering, and in the determining step, whether filtering may be executed on all of the boundaries in a plurality of the picture or filtering is not executed on the boundaries is determined based on the one filter information item.

For example, in the fourth obtaining step, obtainment of the plurality of filter information items except for the one filter information item may be skipped, when the tile constraint information indicates that there is the constraint in the filtering.

In addition, an image encoding apparatus according to an aspect of the present disclosure includes: a constraint information generating unit configured to generate tile constraint information indicating whether or not there is a constraint in filtering on boundaries between adjacent tiles among a plurality of tiles obtained by dividing a picture, and store the tile constraint information into a sequence parameter set; and a filter information generating unit configured to generate, for each of the boundaries, one of a plurality of filter information items respectively indicating whether or not filtering is executed on the boundaries, and storing the plurality of filter information items into a plurality of picture parameter sets, wherein the filter information generating unit is configured to generate the plurality of filter information items which indicate identical content when the tile constraint information indicates that there is the constraint in the filtering.

In addition, an image decoding apparatus according to an aspect of the present disclosure is an image decoding apparatus which decodes a stream generated by the image encoding apparatus, and includes: a first obtaining unit configured to obtain the sequence parameter set from the stream; a second obtaining unit configured to obtain the tile constraint information included in the sequence parameter set; and a determining unit configured to determine whether filtering is executed on all of the boundaries in a plurality of the picture or filtering is not executed on the boundaries, when the tile constraint information indicates that there is the constraint in the filtering.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are described with reference to the drawings.

It is to be noted that each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims which define the most generic concept are described as arbitrary structural elements.

Embodiment 1

In this embodiment, a description is given of parallel decoding in an image decoding apparatus capable of performing parallel decoding. In this embodiment, a bitstream includes information with which the image decoding apparatus can easily execute parallel processing.

First, a description is given of decoding performed in the case where a slice header is always disposed at the top of each tile.

The tile method makes it possible to evenly divide an image into rectangles (in a matrix), to thereby reduce the width of resulting areas in the horizontal direction. In this way, the tile method provides an advantageous effect of reducing a memory size required for an image having a large width in the horizontal direction (for example, an image having a resolution called 4K or 8K). In addition, the tile method makes it easier to evenly divide pixel data in a tile area, which facilitates parallel processing. For this reason, it is important to start parallel decoding from the top of a tile in order to execute parallel decoding efficiently.

It is to be noted that the entropy decoding unit is configured to search for only a slice header in advance to obtain header information, to thereby easily detect the top position of the slice header. For this reason, with the restricted structure, a slice header is always present at the top position of a tile. Thus, the image decoding apparatus can easily determine, using the slice header, the start point of a tile, that is, the start location for parallel decoding. Furthermore, since information necessary for decoding is included in the slice header, there is no need to buffer information of the slice header prior to decoding.

A method for easily realizing this structure is described in Embodiment 3.

Figure 5:
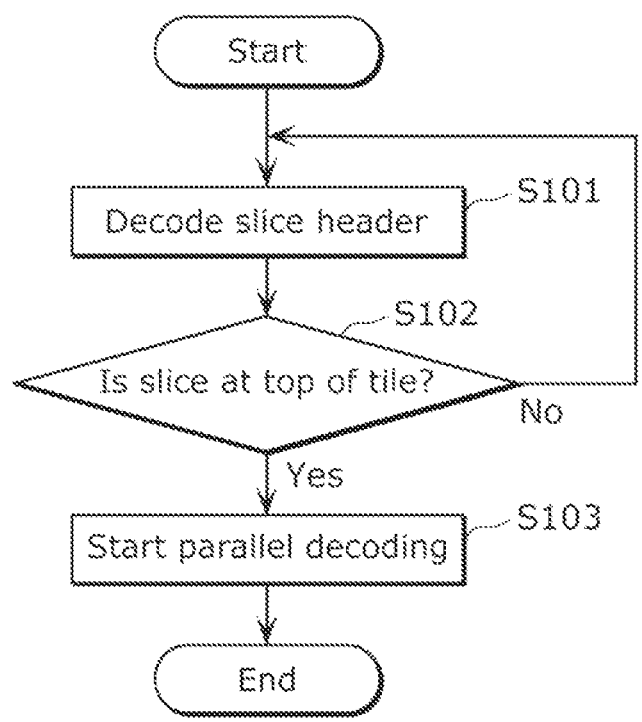
FIG. 5 is a flowchart of decoding processes according to Embodiment 1 disclosed herein.

FIG. 5 is a flowchart indicating a flow of parallel decoding processes in the case of this structure. First, the image decoding apparatus decodes a slice header (S101). Next, the image decoding apparatus determines whether or not this slice is positioned at the top of the tile (S102). For example, in the case of a slice header X illustrated in FIG. 3, this slice is not positioned at the top of a tile (No in S102), and thus the image decoding apparatus decodes the next slice header (S101). In the case of a slice header Y illustrated in FIG. 3, this slice is positioned at the top of a slice (Yes in S102), the image decoding apparatus starts parallel decoding at the position (S103). This sequence of processes is executed repeatedly until processing on the whole image finishes. When all of the functions of parallel decoding units included in the image decoding apparatus are in use, the image decoding apparatus waits until the decoding units become available. In the cases other than the above case, the next slice header is obtained in parallel with decoding on a slice. In this way, obtainment of the slice header sets a start of parallel decoding.

Next, a description is given of a method of determining whether or not a slice header is positioned at the top of a tile.

First, a determination method in a comparison example is described using FIG. 6 in comparison with this embodiment. In this determination method, an image decoding apparatus firstly obtains position information indicating a position of a slice included in a slice header (S201). In addition, the image decoding apparatus obtains, in advance, tile division information indicating how a tile is divided, and stores it in a memory. Next, the image decoding apparatus obtains the top position of the next tile, using the tile division information (S202). Lastly, the image decoding apparatus compares the position of a processing target slice (the top position of the slice) and the top position of the tile, and when these two positions are identical to each other, the slice header is determined to be at the top of a tile. On the other hand, when these two positions are different from each other, the slice header is determined to be at a position other than the top of a tile (S203).

In this way, the determination method according to this comparison example requires a large number of steps for starting parallel decoding, such as a process for monitoring a currently being processed position, a process for accessing a memory, a process for comparing two positions, and so on. In this way, the determination method produces processing time losses.

Next, a determination method according to this embodiment is described using FIG. 7. In this embodiment, a 1-bit flag indicating whether or not a slice is positioned at the top of a tile is included in a slice header of the slice. As illustrated in FIG. 7, the image decoding apparatus obtains this flag (S111), and checks the value of the flag (S112), and can thereby determine whether or not the slice is positioned at the top of the tile. In this way, the image decoding method according to this embodiment makes it possible to determine whether or not the slice is positioned at the top of the tile, with a small amount of processing.

FIG. 8 is a diagram illustrating a syntax of a slice header. The 1-bit flag is, for example, a start_tile_in_slice_flag illustrated in FIG. 8. When the start_tile_in_slice_flag indicates "1", the slice starts at the upper-left end position of a tile (the top of the tile). In the opposite case (where the start_tile_in_slice_flag indicates "0"), the slice does not start at the upper-left end position of the tile. The flag is disposed at the top of the slice header here, but the position of the flag is not limited thereto. It is to be noted that it is possible to start parallel decoding more quickly as the position of the flag becomes closer to the top of the slice header.

Figure 9:
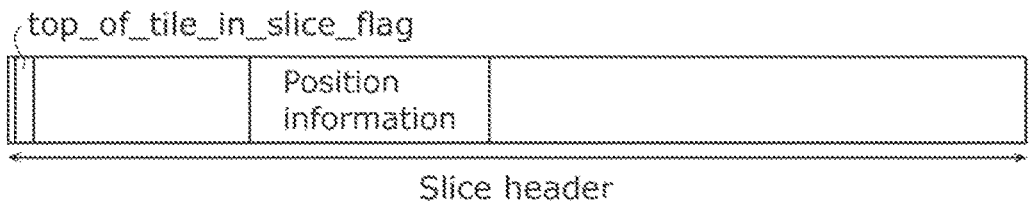
FIG. 9 is a diagram illustrating an example of a structure of a stream according to Embodiment 1.
Figure 10:
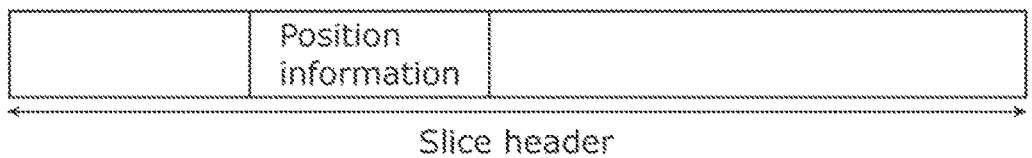
FIG. 10 is a diagram illustrating an example of a structure of a stream according to the comparison example with respect to Embodiment 1.

FIG. 9 is a diagram illustrating an exemplary structure of a stream in this case. FIG. 10 is a diagram illustrating an exemplary structure of a stream in a case where such a flag is not used. The position information (or tile division information) indicating the position of a slice is disposed at a middle part of the slice header. Thus, in order for the obtainment of the position information, the image decoding apparatus inevitably obtains information that is unnecessary in the case where the slice is not at the top of a tile (in the case where parallel decoding starts at a position other than the top of the slice). Thus, such a redundant process occurs when the flag is not used. On the other hand, when a 1-bit flag is disposed at the top of the slice header as illustrated in FIG. 9 or a position close to the top, the image decoding apparatus can immediately start parallel processing.

Next, a description is given of a case where a slice header is not located at the top of a tile as illustrated in FIG. 4. Since the tile method makes it possible to evenly divide an image into rectangles, it is important to start parallel decoding from the top of a tile in order to efficiently execute parallel processing.

In this structure, the top of a slice is not always positioned at the top of a tile. Thus, it is necessary to obtain the top position of a tile and information of a slice header necessary for starting decoding the tile. For this reason, slice headers need to be scanned as in the case of FIG. 3.

Figure 11:
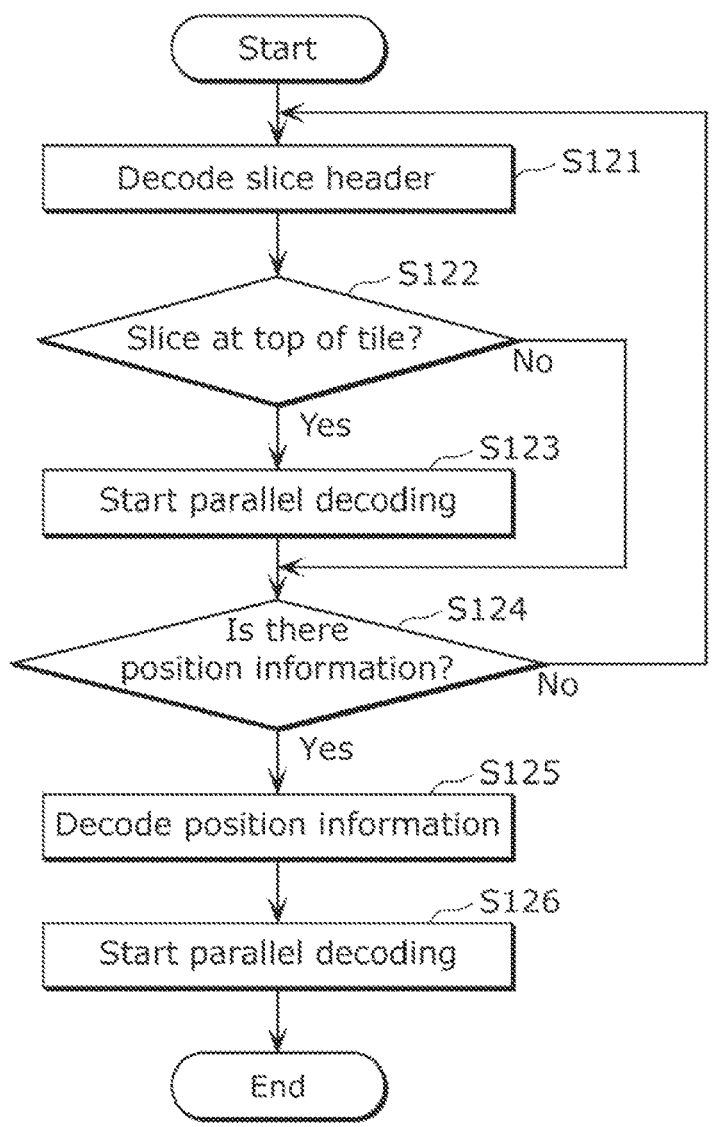
FIG. 11 is a flowchart of decoding processes according to Embodiment 1.

The flow of these processes is described with reference to FIG. 11. First, the image decoding apparatus decodes a slice header (S121). Here, in an exemplary case of a slice header A illustrated in FIG. 4, the top position of the slice header and the top position of a tile match (Yes in S122). Thus, the image decoding apparatus starts parallel decoding on the tile (S123).

On the other hand, in the case of a slice header B illustrated in FIG. 4, the top position of the slice header and the top position of a tile do not match (No in S122). Thus, a transition to Step S124 is made.

Next, the image decoding apparatus checks whether or not position information of a current tile to the next tile is included (S124). This position information indicates a distance from the current tile to the next tile in the case where a plurality of tiles are included in a slice. When the position information is included (Yes in S124), the image decoding apparatus decodes the position information (S125), performs a file seek (search) to reach the next tile according to the position information obtained through the decoding, and performs parallel decoding (S126). On the other hand, when no such position information is included (No in S124), the image decoding apparatus decodes the header of the next slice (S121). This sequence of processes is executed repeatedly until processing on the whole image finishes. When all of the functions of parallel decoding units included in the image decoding apparatus are in use, the image decoding apparatus waits until the decoding units become available.

When slice headers are not always positioned at the tops of tiles in such a case, complex processing is required compared to the case where slice headers are always positioned at the tops of tiles. Even in this case, it is possible to reduce the amount of such complex processing by disposing a flag start_tile_in_slice_flag described earlier with reference to FIG. 8 at the top of a slice. In this way, it is possible to realize faster decoding.

Figure 12:
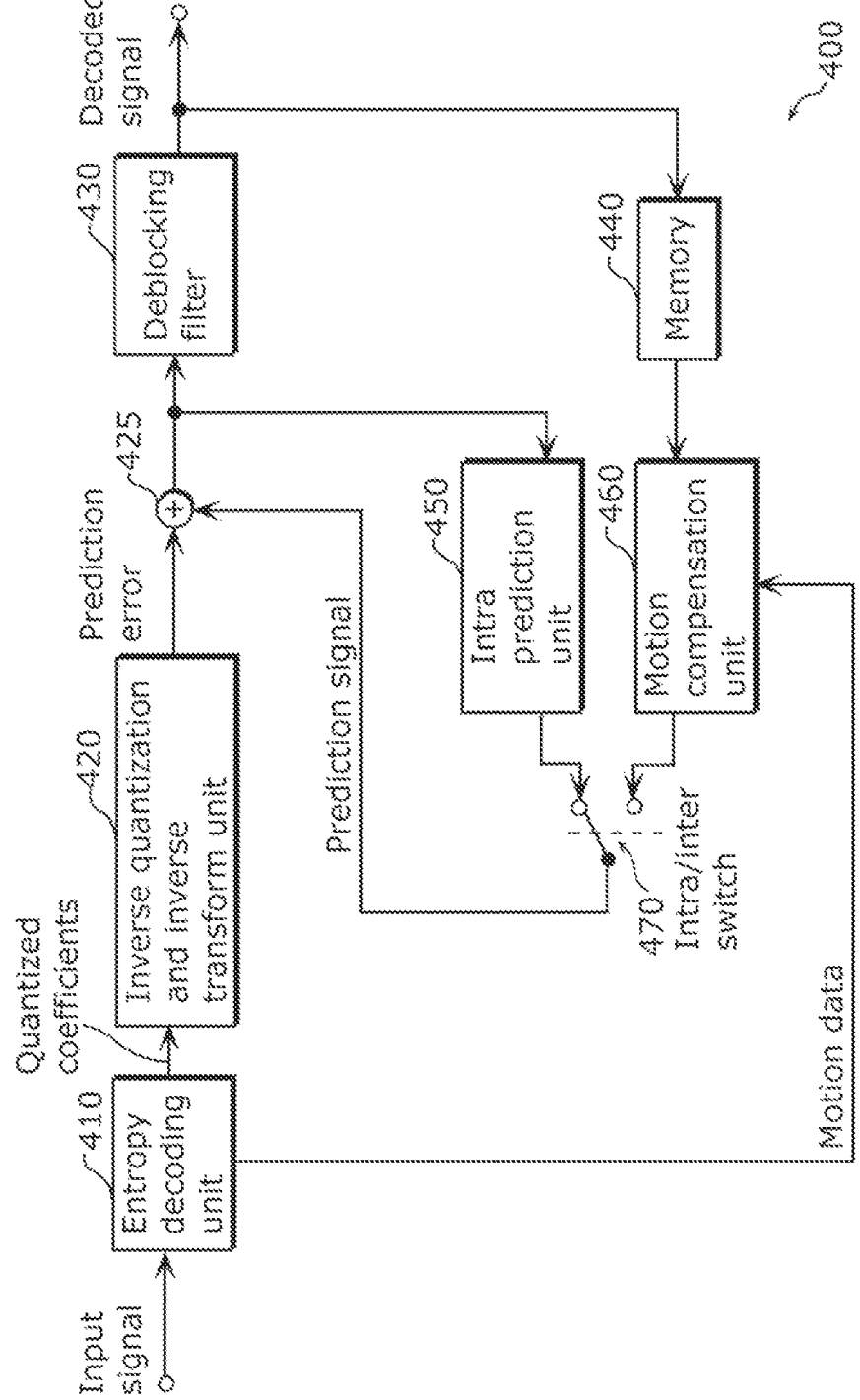
FIG. 12 is a block diagram of an image decoding apparatus according to Embodiment 1.

The parallel decoding according to this embodiment is executed by an image decoding apparatus which decodes encoded image data which have been compression-encoded. FIG. 12 is a block diagram illustrating an exemplary structure of an image decoding apparatus 400 according to this embodiment. The parallel decoding processes illustrated in FIG. 5, 7, or 11 are executed by an entropy decoding unit 410.

The image decoding apparatus 400 generates a decoded signal by decoding encoded image data which have been compression-encoded (an input signal). For example, the image decoding apparatus 400 receives the encoded data as an input signal, on a per block basis. The image decoding apparatus 400 reconstructs the image data by performing variable length decoding, inverse quantization, and inverse transform on the input signal.

As illustrated in FIG. 12, the image decoding apparatus 400 includes: an entropy decoding unit 410; an inverse quantization and inverse transform unit 420; an adder 425; a deblocking filter 430; a memory 440; an intra prediction unit 450; a motion compensation unit 460; and an intra/inter switch 470.

The entropy decoding unit 410 reconstructs quantized coefficients by performing variable length decoding on the input signal (an input stream). Here, the input signal (input stream) is a decoding target signal and corresponds to data of each block of the encoded image data. In addition, the entropy decoding unit 410 obtains motion data from the input signal, and outputs the obtained motion data to the motion compensation unit 460.

The inverse quantization and inverse transform unit 420 reconstructs transform coefficients by performing inverse quantization on the quantized coefficients reconstructed by the entropy decoding unit 410. The inverse quantization and inverse transform unit 420 then reconstructs a prediction error by performing inverse transform on the reconstructed transform coefficients.

The adder 425 generates a decoded image by adding the reconstructed prediction error and the prediction signal.

The deblocking filter 430 performs deblocking filtering on the generated decoded image. The decoded image subjected to the deblocking filtering is output as a decoded signal.

The memory 440 is a memory for storing reference images for use in motion compensation. More specifically, the memory 440 stores the decoded image subjected to the deblocking filtering.

The intra prediction unit 450 generates a prediction signal (intra prediction signal) by performing intra prediction. More specifically, the intra prediction unit 450 generates an intra prediction signal by performing intra prediction with reference to an image located around the decoding target block (input signal) in a decoded image generated by the adder 425.

The motion compensation unit 460 generates a prediction signal (inter prediction signal) by performing motion compensation on the motion data output from the entropy decoding unit 410.

The intra/inter switch 470 selects one of an intra prediction signal and an inter prediction signal, and outputs the selected signal as a prediction signal to the adder 425.

With the structure, the image decoding apparatus 400 according to this embodiment decodes the encoded image data which have been compression encoded.

As described above, the image decoding apparatus and the image decoding method according to this embodiment makes it possible to easily determine a processing start point in a bitstream which is suitable for the structure of the image decoding apparatus. In other words, the image decoding apparatus and the image decoding method make it possible to easily determine whether or not the position searched by parsing a slice header is at the top of a tile. In this way, it is possible to realize the image decoding apparatus for faster processing.

In addition, with this structure, it is possible to easily estimate processing time. In this way, it is possible to realize the image decoding apparatus in form of a fast operation circuit for use in, for example, real-time reproduction of a high-resolution video etc.

Embodiment 2

In this embodiment, descriptions are given of an image encoding method for generating an encoded bitstream which facilitates execution of parallel decoding and transmitting the encoded bitstream, and an image encoding apparatus which performs the image encoding method. The image encoding apparatus transmits, to an image decoding apparatus, information indicating whether or not the position of a slice header is at the top of a tile. In this way, the image encoding apparatus can generate a bitstream which increase a parallel degree in decoding processing.

The image encoding apparatus according to this embodiment determines whether or not the position of a slice header is at the top position of a tile when encoding the slice header. When the position of the slice header is at the top of the tile, for example, a flag start_tile_in_slcie_flag illustrated in FIG. 8 is described in the slice header.

By doing so, the image encoding apparatus is capable of generating an encoded bitstream with which parallel decoding can be started easily by the image decoding apparatus capable of performing parallel decoding as described in Embodiment 1.

Figure 13:
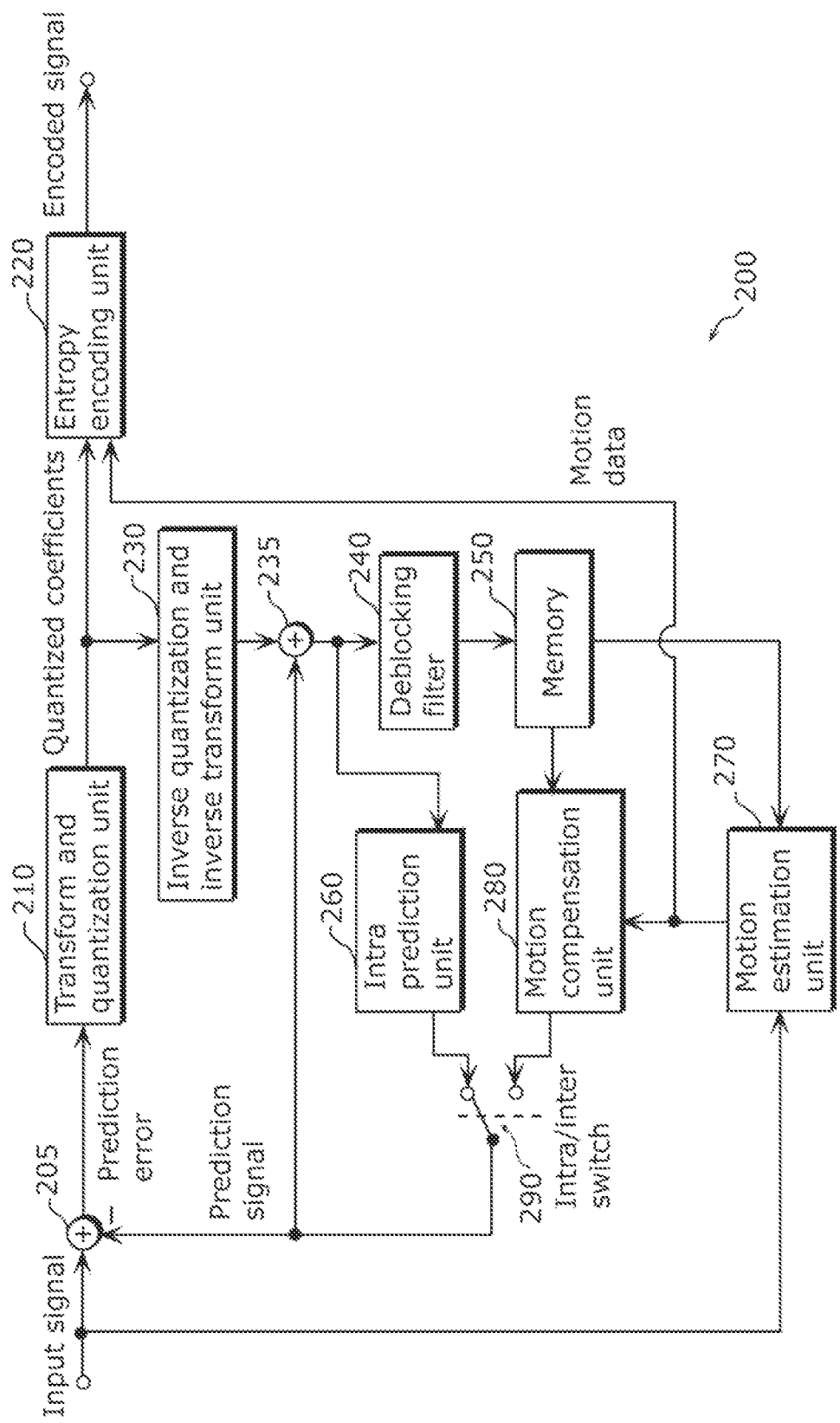
FIG. 13 is a block diagram of an image encoding apparatus according to Embodiment 2.

FIG. 13 is a block diagram illustrating an exemplary structure of an image encoding apparatus according to this embodiment. The image encoding apparatus 200 illustrated in FIG. 13 includes: a subtracter 205; a transform and quantization unit 210; an entropy encoding unit 220; an inverse quantization and inverse transform unit 230; and an adder 235; a deblocking filter 240; a memory 250; an intra prediction unit 260; a motion estimation unit 270; a motion compensation unit 280; and an intra/inter switch 290.

The subtracter 205 calculates a difference between an input signal and a prediction signal, that is, a prediction error.

The transform and quantization unit 210 generates transform coefficients in a frequency domain by transforming the prediction error in a spatial domain. For example, the transform and quantization unit 210 generates transform coefficients by performing Discrete Cosine Transform (DCT) on the prediction error. Furthermore, the transform and quantization unit 210 generates transform coefficients by quantizing the transform coefficients.

The entropy encoding unit 220 generates an encoded signal by performing variable length encoding on the quantized coefficients. In addition, the entropy encoding unit 220 encodes motion data (for example, a motion vector) estimated by the motion estimation unit 270, and outputs an encoded signal including the motion data.

The inverse quantization and inverse transform unit 230 reconstructs transform coefficients by performing inverse quantization on the quantized coefficients. Furthermore, the inverse quantization and inverse transform unit 230 reconstructs a prediction error by performing inverse transform on the reconstructed transform coefficients. The reconstructed prediction error does not match a prediction error which is generated by the subtracter 205 due to information loss in quantization. In other words, the reconstructed prediction error includes a quantization error.

The adder 235 generates a local decoded image by adding the reconstructed prediction error and the prediction signal.

The deblocking filter 240 performs deblocking filtering on the generated local decoded image.

The memory 250 is a memory for storing reference images for use in motion compensation. More specifically, the memory 250 stores the local decoded image subjected to the deblocking filtering.

The intra prediction unit 260 generates a prediction signal (intra prediction signal) by performing intra prediction. More specifically, the intra prediction unit 260 generates an intra prediction signal by performing intra prediction with reference to an image located around the encoding target block (input signal) in a local decoded image generated by the adder 235.

The motion estimation unit 270 estimates motion data (for example, a motion vector) between the input signal and a reference image stored in the memory 250.

The motion compensation unit 280 generates a prediction signal (inter prediction signal) by performing motion compensation on the estimated motion data.

The intra/inter switch 290 selects one of an intra prediction signal and an inter prediction signal, and outputs the selected signal as a prediction signal to the subtracter 205 and the adder 235.

With the structure, the image encoding apparatus 200 according to this embodiment compression-encodes the image data.

Here, the process for determining whether or not a slice header is at the top of a tile and the flag encoding process are performed by the entropy encoding unit 220.

As described above, the image encoding apparatus and the image encoding method according to this embodiment are intended to transmit information related to a decoding order to the image decoding apparatus. In this way, the image encoding apparatus and the image encoding method make it possible to generate an encoded signal (bitstream) with which the image decoding apparatus can perform fast processing.

Embodiment 3

In this embodiment, a description is given of a structure of an encoded bitstream which facilitates parallel processing in the case where the top of a tile is always a slice header as illustrated in FIG. 3.

First, the processing in a comparison example in this embodiment is described with reference to FIG. 14. First, the image decoding apparatus obtains a sequence parameter set (SPS) (S231). Next, the image decoding apparatus decodes a flag A for facilitating parallel processing included in an SPS (S232). Next, the image decoding apparatus decodes a flag B for facilitating parallel processing included in a picture parameter set (PPS) (S233). In addition, the image decoding apparatus decodes a flag C for facilitating parallel processing included in a PPS (S234).

All of these flags A to C are parameters for facilitating parallel processing. Next, the image decoding apparatus determines whether or not these parameters match a parallel processing requirement (also referred to as a constraint_tile set) included in the image decoding apparatus (S235). In other words, the image decoding apparatus determines, using these parameters, whether or not the image decoding apparatus has a function for performing parallel decoding on a processing target stream. When these parameters match the parallel processing requirement included in the image decoding apparatus (Yes in S235), the image decoding apparatus determines whether or not the processing target stream can be processed in parallel decoding, and performs parallel decoding on the stream (S236). Specifically, the parallel decoding here is processing described in Embodiment 1.

On the other hand, when these parameters do not match the parallel processing requirement included in the image decoding apparatus (No in S235), the image encoding apparatus performs normal decoding instead of parallel decoding (S237).

However, in this case, a large number of flags are necessary for determining whether or not parallel decoding is possible. In addition, it is difficult to manage parameter relationships which can be processed in parallel decoding. In this embodiment, a flag called constraint_tile_flag indicating a requirement for parallel decoding is added to an SPS.

Figure 15:
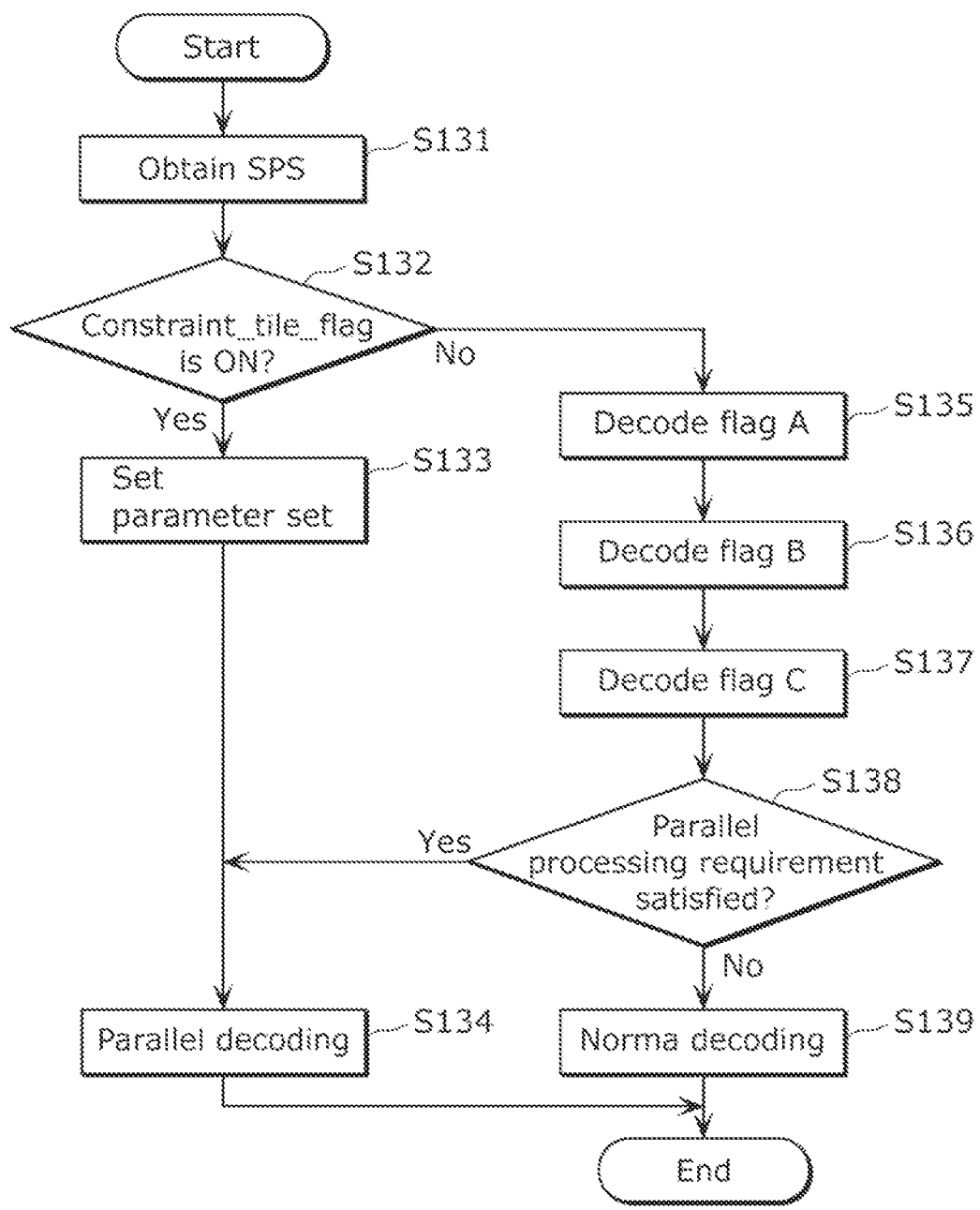
FIG. 15 is a flowchart of decoding according to Embodiment 3.

FIG. 15 is a flowchart of an image decoding processes according to this embodiment.

As illustrated in FIG. 15, the image decoding apparatus obtains the SPS, and decodes the flag included in the SPS (S131). When the flag indicates that parallel decoding is possible (Yes in S132), the image decoding apparatus sets the parameter set which facilitates predetermined parallel decoding (S133), and executes parallel decoding (S134).

Figure 14:
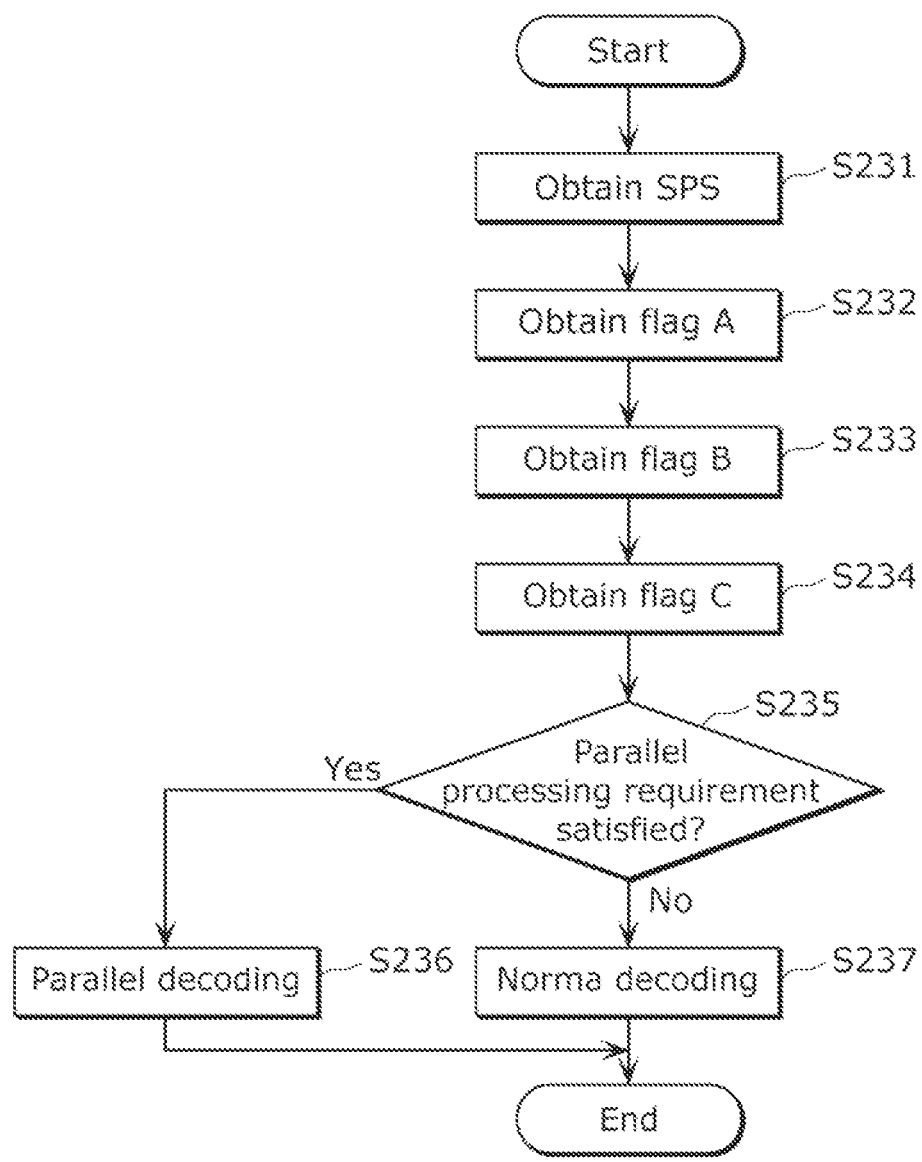
FIG. 14 is a flowchart of decoding processes according to the comparison example with respect to Embodiment 3.

On the other hand, when the flag indicates that parallel decoding is impossible (No in S132), the image decoding apparatus obtains the parameters (flags A to C) as in the case of FIG. 14 (S135 to S137), and makes a determination using the obtained parameters (S138). Here, a determination that parallel decoding is possible is made only when the stream is suitable for the image decoding apparatus. Depending on the determination result, either parallel decoding (S134) or normal decoding (S139) is executed, as in the case of FIG. 14.

It is noted that indices such as 0, 1, 2, 3 indicating parallel degree levels may be used instead of the flags indicating whether parallel decoding is possible. In this case, in Step S132, when a value of an index indicates a mismatch with a parallel degree corresponding to the image decoding apparatus, a transition to Step S133 is made, and otherwise, a transition to Step S135 is made.

Figures 18, 19A:
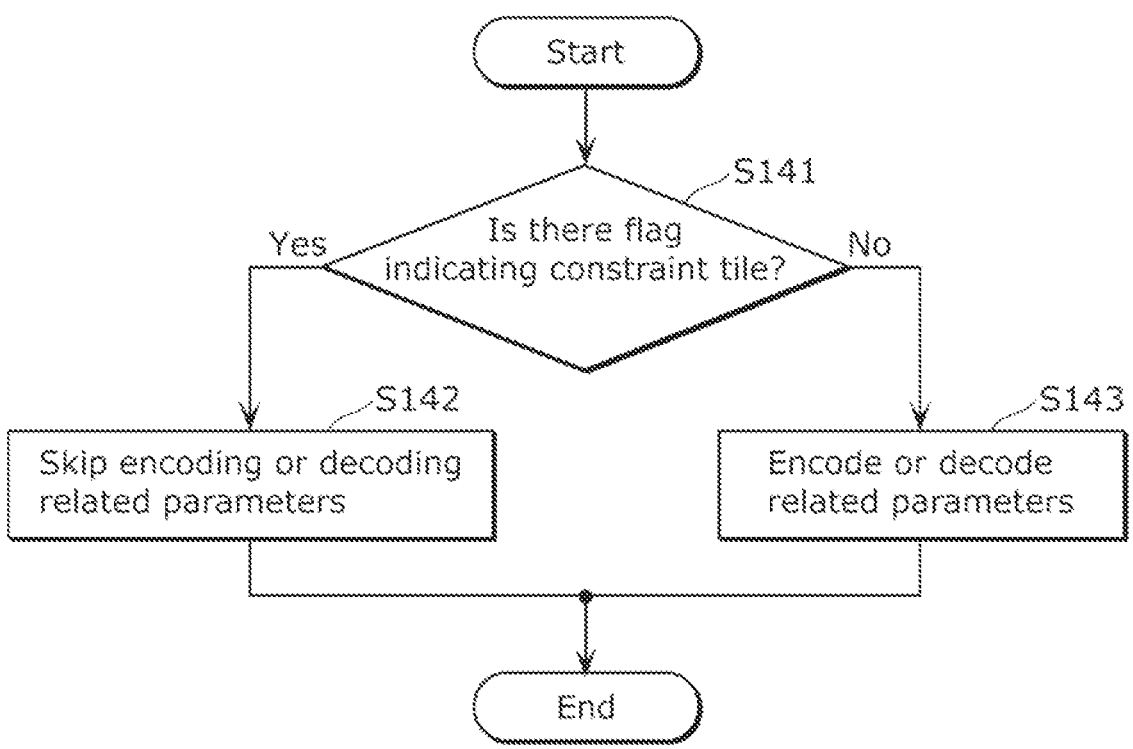
FIG. 18 is a diagram illustrating an example of a flag according to Embodiment 3.
FIG. 19A is a flowchart of decoding processes according to Embodiment 3.

FIGS. 16, 17, and 18 illustrate specific examples of flags A, B, and C. Here, the meaning of a parameter is the same as described in Non-patent Literature 2, unless otherwise specified.

Here, flags loop_filter_across_tile_flag, loop_filter_across_slice_flag, and tile_boundary_independence_flag indicate whether or not a filter is applied to a boundary between tiles or slices. When a filter is applied, previously decoded images need to be stored in a memory, which is not suitable for fast parallel processing. Parallel processing becomes more difficult when execution or non-execution of filtering on each boundary between tiles is switched within a picture.

The use of tiles having no dependency on any of the other tiles further facilitates parallel processing. Here, by disposing a slice header at the top of a tile, it is also possible to reset a state in arithmetic encoding. Thus, with the structure, it is possible to perform fast parallel decoding.

FIG. 19A illustrates a processing example in this case. When an SPS includes a flag constraint_tile_flag (Yes in S141), the image decoding apparatus (or the image encoding apparatus) skips decoding (or encoding) flags tile_boundary_independence_flag, loop_filter_across_tile_flag, and loop_filter_across_slice_flag (S142). On the other words, when an SPS includes a flag constraint_tile_flag (No in S141), the image decoding apparatus (or the image encoding apparatus) performs decoding (or encoding) of parameters of flags tile_boundary_independence_flag, loop_filter_across_tile_flag, and loop_filter_across_slice_flag (S143).

Here, the flag tile_boundary_independence_flag is information indicating whether or not reference to information across a tile boundary is prohibited. The flag loop_filter_across_tile_flag is information indicating whether or not filtering is executed on a tile boundary. The flag loop_filter_across_slice_flag is information indicating whether or not filtering is executed on a slice boundary.

These flags make it possible to skip encoding and decoding unnecessary codes, thereby reducing the amount of codes.

As described above, the image encoding apparatus according to this embodiment generates tile constraint information (constraint_tile_flag) indicating whether or not there is the constraint in encoding or decoding of a plurality of tiles obtained by dividing a picture, and encodes the tile constraint information. In addition, when the tile constraint information indicates that there is the constraint in encoding or decoding, the image encoding apparatus skips encoding or decoding filter information (loop_filter_across_tile_flag) indicating whether or not filtering is executed on the plurality of tile boundaries.

Here, when encoding or decoding of the filter information is skipped, the image encoding apparatus and the image decoding apparatus cannot switch execution or non-execution of filtering on each of the plurality of tile boundaries. In other words, the plurality of tile boundaries are subjected to an identical process (of filtering or skipping filtering). In this way, it is possible to reduce the amount of processing by prohibiting a switch between execution or non-execution of filtering on a per tile boundary basis.

Figure 19B:
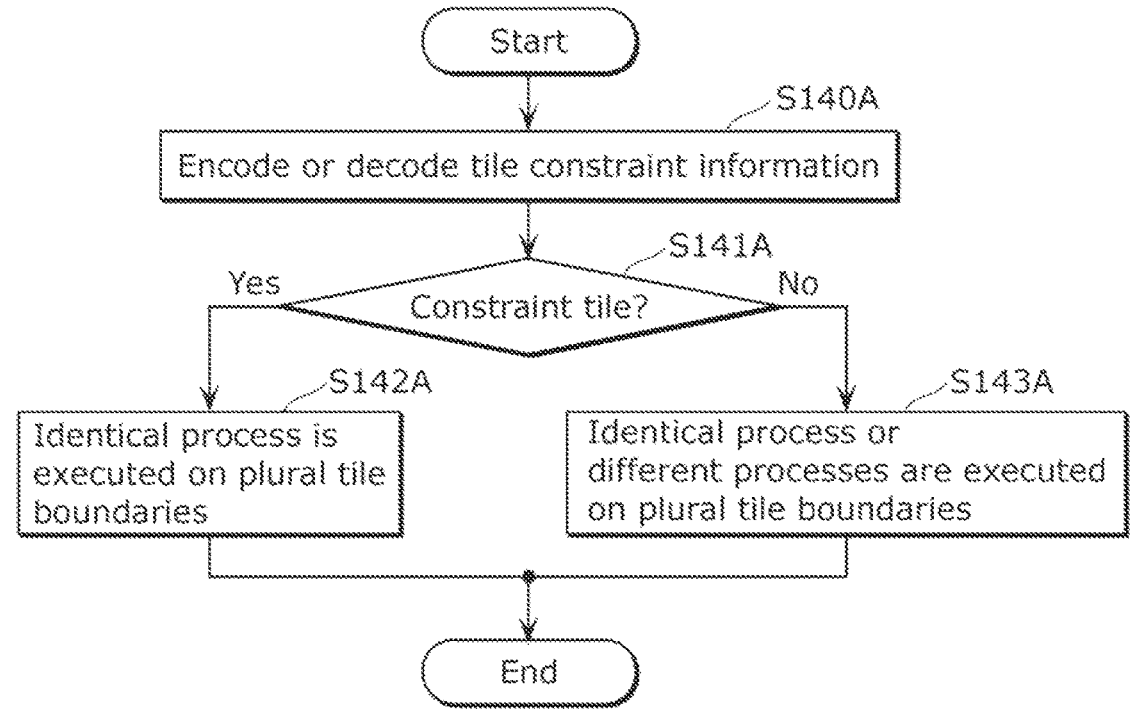
FIG. 19B is a flowchart of decoding processes according to Embodiment 3.

FIG. 19B illustrates operations performed by the image encoding apparatus or the image decoding apparatus. As illustrated in FIG. 19B, the image encoding apparatus according to this embodiment generates tile constraint information indicating whether or not there is any constraint in the filtering on the plurality of tiles obtained by dividing the picture, and encodes the tile constraint information (S140A). When the tile constraint information indicates that there is a constraint in the filtering (Yes in S141A), the image encoding apparatus performs an identical process (of filtering or skipping filtering) on the plurality of tile boundaries (S142A). On the other hand, when the tile constraint information indicates that there is no constraint in the filtering (No in S141A), the image encoding apparatus performs an identical process or different processes (of filtering or skipping filtering) on the plurality of tile boundaries (S143A).

In addition, the image decoding apparatus decodes tile constraint information indicating whether or not there is any constraint in the filtering on the plurality of tiles obtained by dividing the picture (S140A). When the tile constraint information indicates that there is a constraint in the filtering (Yes in S141A), the image encoding apparatus performs an identical process (of filtering or skipping filtering) on the plurality of tile boundaries (S142A). On the other hand, when the tile constraint information indicates that there is no constraint in the filtering (No in S141A), the image encoding apparatus performs an identical process or different processes (of filtering or skipping filtering) on the plurality of tile boundaries (S143A).

In order to perform the identical process on the plurality of tile boundaries in this way, the image encoding apparatus or the image decoding apparatus may encode or decode only one of filter information items on one of the tile boundaries instead of skipping encoding or decoding all of the filter information items for the plurality of tile boundaries. In other words, in this way, the image encoding apparatus or the image decoding apparatus determines whether or not filtering is executed on the plurality of tile boundaries, based on the one of the filter information items. More specifically, when the one filter information item indicates that filtering is executed on the tile boundaries, the image encoding apparatus or the image decoding apparatus executes filtering on all of the plurality of tile boundaries. On the other hand, when the one filter information item indicates that no filtering is executed on the tile boundaries, the image encoding apparatus or the image decoding apparatus does not execute filtering on the plurality of tile boundaries.

Figure 19C:
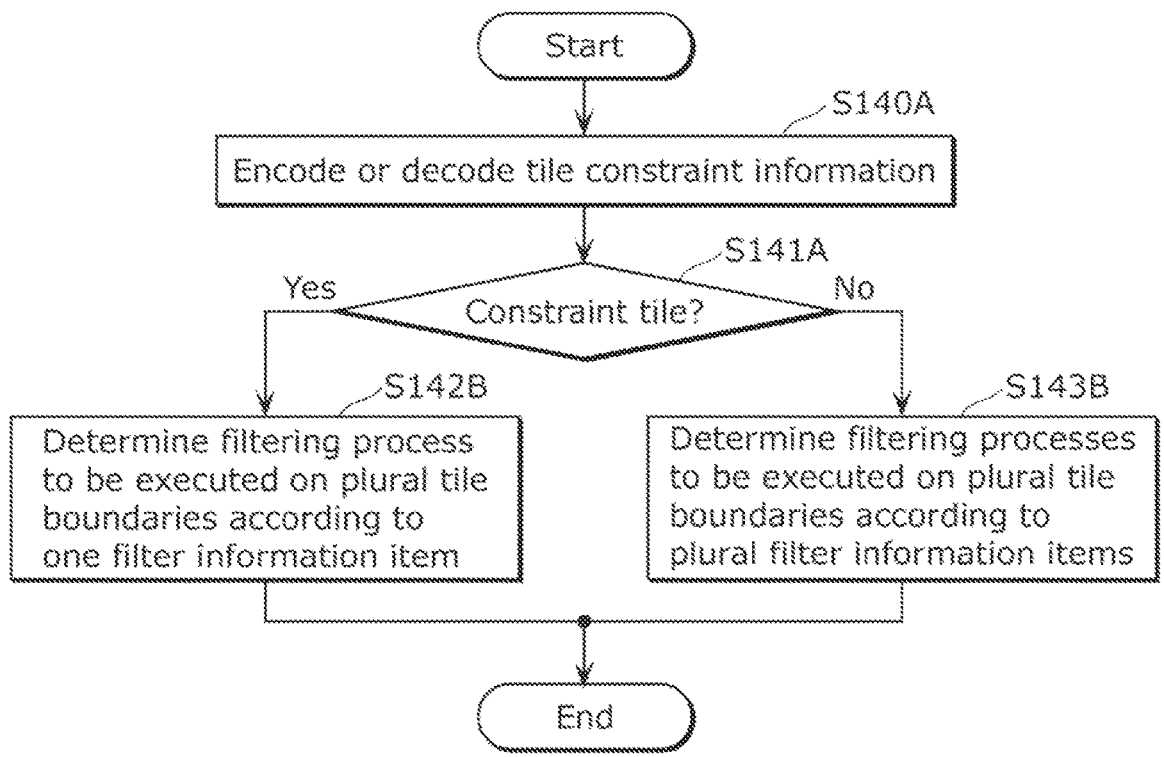
FIG. 19C is a flowchart of decoding processes according to Embodiment 3.

FIG. 19C illustrates operations performed by the image encoding apparatus or the image decoding apparatus in this case. As illustrated in FIG. 19C, when the tile constraint information indicates that there is a constraint in the filtering (Yes in S141A), the image encoding apparatus or the image decoding apparatus determines whether or not filtering is executed on the plurality of tile boundaries, based on filter information indicating whether or not filtering is executed on one tile boundary among the plurality of tile boundaries (S142B). In addition, when the tile constraint information indicates that there is no constraint in the filtering (No in S141A), the image encoding apparatus or the image decoding apparatus determines whether or not filtering is executed on the plurality of tile boundaries, based on the plurality of filter information items indicating whether or not filtering is executed on the plurality of tile boundaries (S143B).

In other words, when the tile constraint information indicates that there is the constraint, the image encoding apparatus encodes filter information indicating whether or not filtering is executed on the one tile boundary, and skips encoding the information indicating whether or not filtering is executed on the plurality of tile boundaries other than the one tile boundary. In other words, when the tile constraint information indicates that there is the constraint, the image decoding apparatus decodes filter information indicating whether or not filtering is executed on the one tile boundary, and skips decoding the information indicating whether or not filtering is executed on the plurality of tile boundaries other than the one tile boundary.

Alternatively, the same value may be set to all of the plurality of filter information items. In other words, when the tile constraint information indicates that there is the constraint in the filtering, the image encoding apparatus may encode the filter information items indicating the identical content (execution or non-execution of filtering), in association with each of the plurality of filter boundaries.

Figures 19D, 20A, 20B:
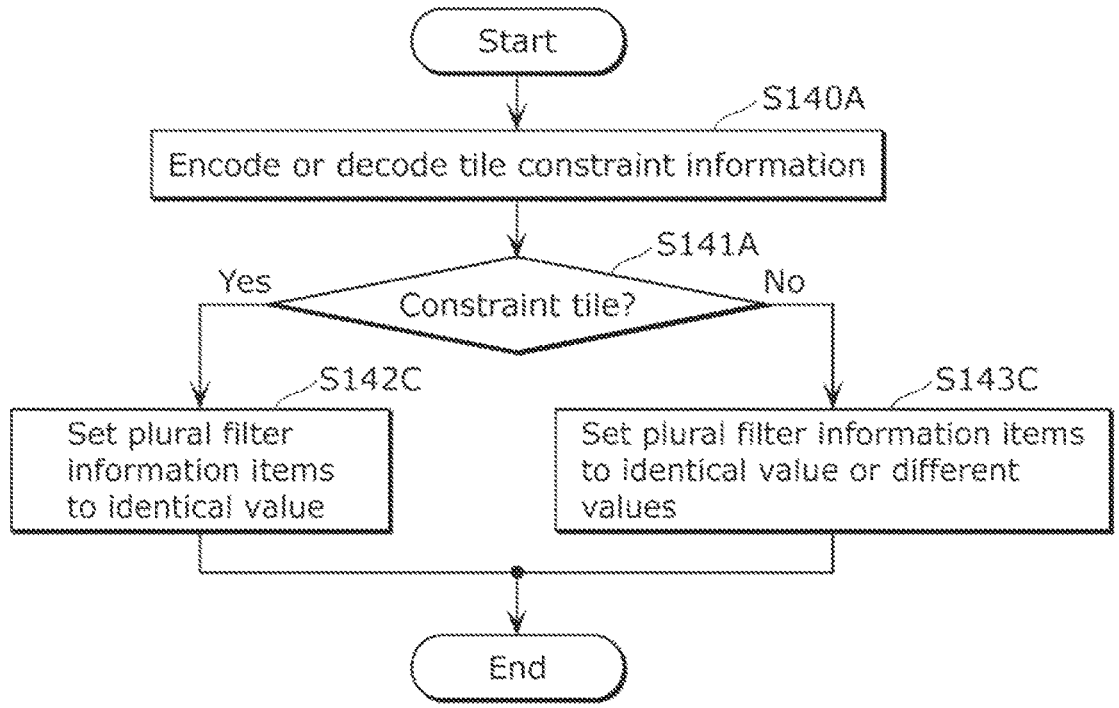
FIG. 19D is a flowchart of decoding processes according to Embodiment 3.
FIG. 20A is a diagram illustrating an example of a structure of a slice header according to a comparison example with respect to Embodiment 4.
FIG. 20B is a diagram illustrating an example of a structure of a slice header according to Embodiment 4.

FIG. 19D illustrates operations performed by the image encoding apparatus or the image decoding apparatus in this case. As illustrated in FIG. 19D, when tile constraint information indicates that there is a constraint (Yes in S141A), the image encoding apparatus encodes the filter information item indicating the identical content, in association with each of the plurality of tile boundaries (S142C). On the other hand, when the tile constraint information indicates that there is no constraint in the filtering (No in S141A), the image encoding apparatus encodes the filter information items indicating the identical content or different content, in association with the plurality of tile boundaries (S143C).

In addition, when tile constraint information indicates that there is a constraint (Yes in S141A), the image decoding apparatus decodes the plurality of filter information items indicating the identical content associated with the plurality of tile boundaries (S142C). On the other hand, when the tile constraint information indicates that there is no constraint in the filtering (No in S141A), the image encoding apparatus decodes the plurality of filter information items indicating the identical content or different content associated with the plurality of tile boundaries (S143C).

The tile constraint information may be set for each picture. In other words, the image encoding apparatus generates tile constraint information for each picture, and encodes tile constraint information for each picture. In other words, the image decoding apparatus decodes tile constraint information which has been set for each picture.

In addition, the processing is executed by the encoding unit and the determining unit included in the image encoding apparatus, or the decoding unit and the determining unit included in the image decoding apparatus. For example, the encoding unit and the determining unit are included in the entropy encoding unit 220 illustrated in FIG. 13. In addition, the decoding unit and the determining unit are included in the entropy decoding unit 410 illustrated in FIG. 12.

Embodiment 4

In this embodiment, a description is given of a structure for reducing the amount of information in the case of describing a flag start_tile_in_slice_flag in a slice header.

Figure 21:
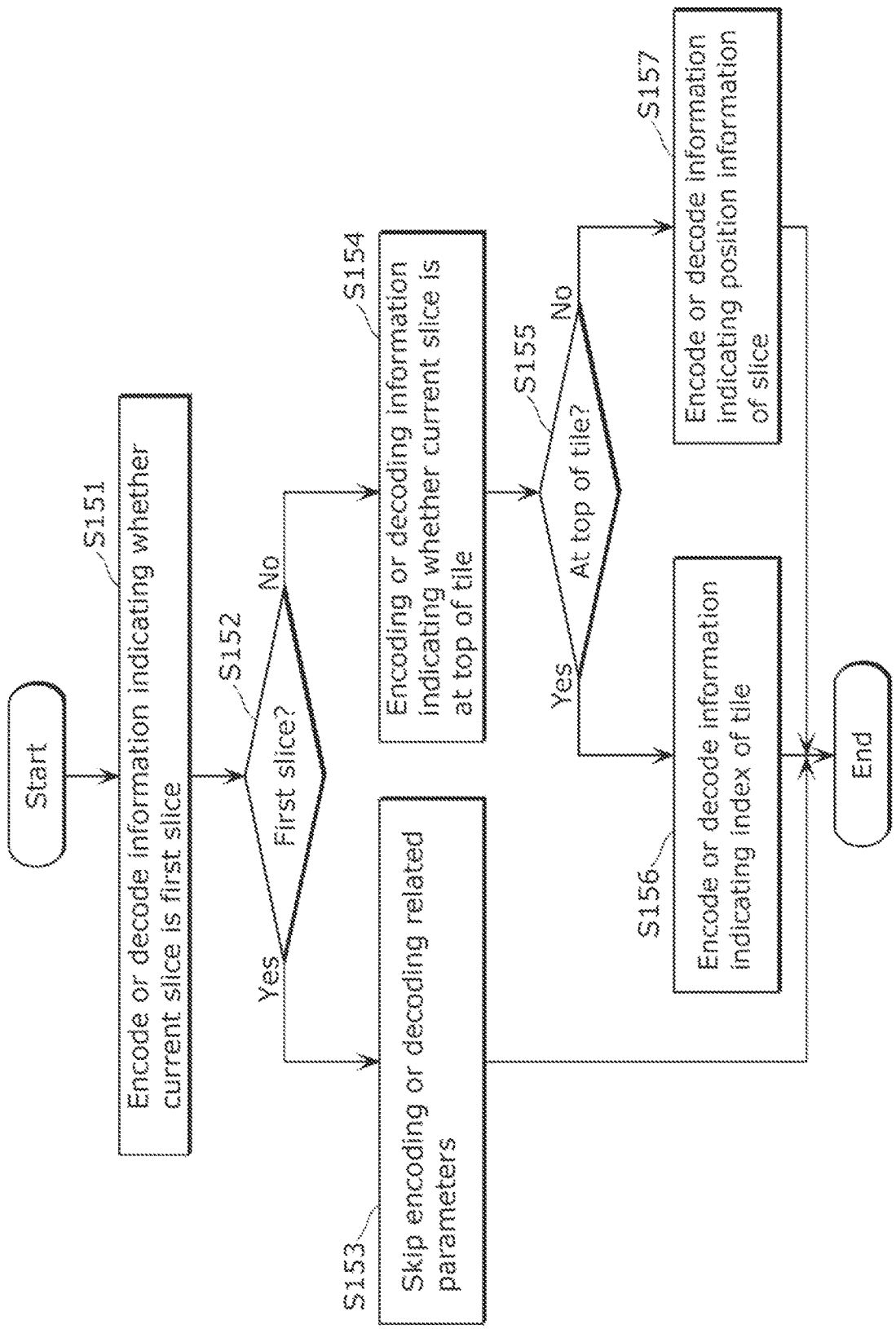
FIG. 21 is a flowchart of decoding processes according to Embodiment 4.

FIG. 20A is a diagram illustrating an exemplary structure of a slice header according to a comparison example with respect to this embodiment. On the other hand, FIG. 20B is a diagram illustrating an exemplary structure of a slice header in this embodiment. In addition, FIG. 21 is a flowchart indicating a flow of operations according to this embodiment.

First, the image encoding apparatus (or the image decoding apparatus) encodes (or decodes) a flag (first_slice_in_pic_flag) indicating whether or not a processing target slice is a first slice (S151). Next, when this flag is not 0 (first_slice_in_pic_flag!=0), in other words, when the processing target slice is the first slice (Yes in S152), the image encoding apparatus (or image decoding apparatus) skips encoding (or decoding) position information of the following slices, initial position information of tiles, or the like (S153).

On the other hand, when this flag is 0 (first_slice_in_pic_flag=0), in other words, when the processing target slice is not a first slice (No in S152), the image encoding apparatus (or the image decoding apparatus) encodes (or decodes) information (start_tile_in_slice_flag) indicating whether or not the processing target slice is at the top of a tile (S154).

Next, when this flag is 1 (start_tile_in_slice_flag=1), in other words, when the processing target slice is at the top of a tile (Yes in S155), the image encoding apparatus (or the image decoding apparatus) encodes (or decodes) information (tile_idx_minus1) indicating how many tiles are disposed before the processing target tile (S156).

On the other hand, when this flag is 0 (start_tile_in_slice_flag=0), in other words, when the processing target slice is not at the top of a tile (No in S155), the image encoding apparatus (or the image decoding apparatus) does not parse the position of the slice, and thus encodes (or decodes) the position information (slice_address) about the slice (S157). In this way, the image encoding apparatus (or the image decoding apparatus) can efficiently perform encoding (or decoding) without transmitting redundant information, and can increase a compression rate while increasing a parallel degree. In addition, the image decoding apparatus can correctly decode this stream.

It is to be noted that the information related to division into tiles is disposed, for example, at a portion called a sequence parameter set for managing information of the whole stream. In addition, for example, this information may indicate the number of divisions of a frame in the vertical direction and in the horizontal direction. Alternatively, this information may indicate the number of processing units into which the frame is divided. It is to be noted that each of the tiles obtained through the divisions are processed according to a scan order (for example, a raster san order) predetermined between the encoding and decoding sides. For this reason, when the processing target slice is at the top of the tile, with the information indicating how many tiles are disposed before the processing target tile, it is possible to determine the spatial position information of the processing target slice in the frame. In this way, it is possible to reduce slice address information.

In addition, when the processing target slice is at the top of the picture, a tile number is always 1, and a slice address is (0, 0), and thus the information does not need to be encoded. In this way, it is possible to reduce the amount of information.

Embodiment 5

In this embodiment, a tile header which holds tile number information (tile_idx_minus1) is used as information indicating a start position of a tile.

Figure 22:
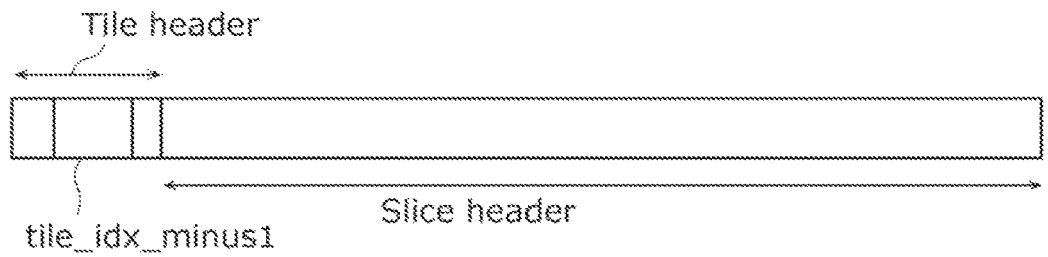
FIG. 22 is a conceptual diagram illustrating a data structure according to Embodiment 5.
Figure 23:
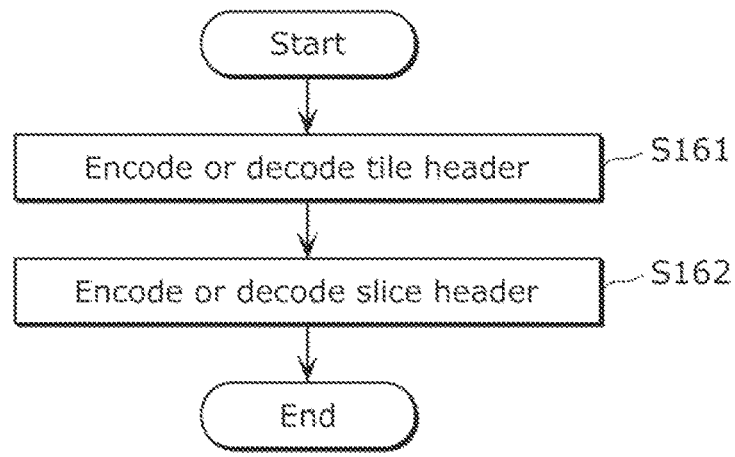
FIG. 23 is a flowchart of encoding and decoding processes according to Embodiment 5.

FIG. 22 is a conceptual diagram illustrating a data structure in this embodiment. As illustrated in FIG. 22, a tile header which is information indicating a start position of a tile is always disposed immediately before a slice header. FIG. 23 is a flowchart indicating a flow of operations performed by an image encoding apparatus (or an image decoding apparatus) in this case.

First, the image encoding apparatus (or the image decoding apparatus) encodes (or decodes) a tile header (tile_header( )) (S161). In this way, the image encoding apparatus (or the image decoding apparatus) obtains the information indicating the top position of the tile, from a sequence parameter set as described earlier, and determines the position of the tile in the frame.

Next, the image encoding apparatus (or the image decoding apparatus) encodes or decodes a slice header related to the tile (S162). In this way, since the information necessary for decoding the tile is included in the slice header, the image decoding apparatus can immediately determine how to decode the tile. Thus, the image decoding apparatus can perform parallel processing at a high speed. In this say, when the tile_header( ) is disposed immediately before the slice_header( ), for example, it is possible to omit a start code of the slice header.

In general, the tile_header( ) and the slice_header( ) are different headers, and thus different start codes are assigned thereto. On the other hand, when a slice header is always disposed immediately after a tile header as in this embodiment, it is possible to omit a start code of the slice header. In general, a start code is a special code having a fixed length. Thus, omission of start codes contributes to significant reduction of redundant codes. In addition, even when a start code is searched for in order to load a header, this redundant search becomes unnecessary. Thus, it is possible to accelerate processing.

Embodiment 6

In this embodiment, a description is given of a case of modifying encoding and decoding of parameters further using profile_idc. The profile_idc is profile information indicating information in the case where a stream is encoded or decoded.

Figure 24:
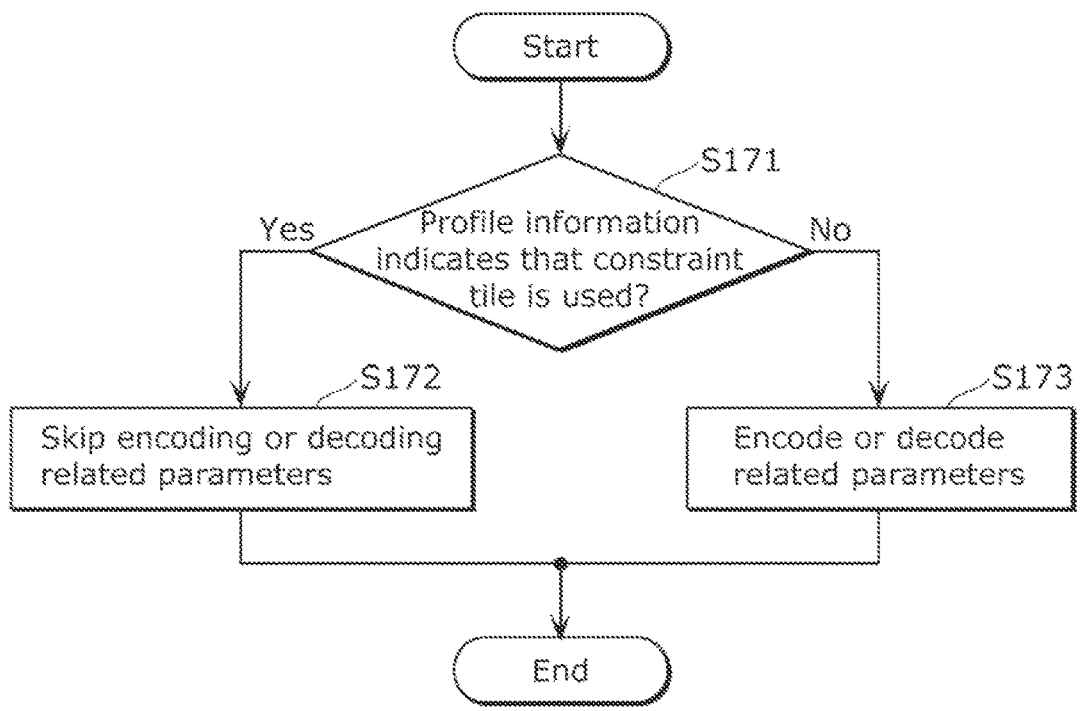
FIG. 24 is a flowchart of encoding and decoding processes according to Embodiment 6.

FIG. 24 is a flowchart indicating a flow of operations performed by an image encoding apparatus (or an image decoding apparatus) in this case. For example, when the profile information indicates that a constraint tile is used (Yes in S171), the image encoding apparatus (or the image decoding apparatus) skips encoding (or decoding) information related to the constraint (a related parameter) which is used when the processing target tile is the constraint tile, and sets the parameter for placing the constraint (S172). Here, constraints are placed so as not to, for example, perform filtering on a boundary, not to refer to information of another tile in encoding (or decoding) in a tile, and so on.

When the profile information does not indicate that the constraint tile is used (No in S171), the image encoding apparatus (or the image decoding apparatus) encodes (or decodes) information (a related parameter) indicating which information is constrained (S173).

For example, when profile information indicates that no tile is used, the image encoding apparatus (or the image decoding apparatus) skips encoding (or decoding) tile-related information in headers such as all of sequence parameter sets, picture parameter sets, slice headers, etc. In this way, it is possible to reduce encoding and decoding of redundant information, to thereby realize fast processing and high compression performances.

It should be noted that the image encoding apparatus and the image decoding apparatus according to the above-described embodiments are exemplary non-limiting embodiments, and thus the scope of the present disclosure is not limited to such embodiments.

Each of the processing units included in the image encoding apparatuses and the image decoding apparatuses according to the above-described embodiments is realized as an LSI which is typically an integrated circuit. These processing units may be made as separate individual chips, or as a single chip to include a part or all thereof.

In addition, the means for circuit integration is not limited to an LSI, and implementation with a dedicated circuit or a general-purpose processor is also available. It is also possible to use a Field Programmable Gate Array (FPGA) that is programmable after the LSI is manufactured, and a reconfigurable processor in which connections and settings of circuit cells within the LSI are reconfigurable.

In the above embodiment, each of the structural elements may be configured with exclusive hardware or by executing a software program suitable for each of the structural elements. Each of the structural elements may be realized by means of the program executing unit such as a CPU or a processor reading and executing such a software program recorded on a hard disc or a semiconductor memory.

Furthermore, the present disclosure may be realized as the above-described software program, or as a non-transitory computer-readable recording medium on which the program is recorded. In addition, the program can naturally be distributed through communication media such as the Internet.

In addition, all of the numerals used above are examples for specifically explaining the present disclosure, and the scope of the present disclosure is not limited to the exemplary numerals.

In addition, divisions into functional blocks in the block diagrams are non-limiting examples. Thus, some of the blocks may be realized as a signal functional block, one of the functional blocks may be divided, and/or part of functions of one of the functional blocks may be transferred to another one of the functional blocks. Similar functions of some of the functional blocks may be processed in parallel or in time division by a single hardware item or software item.

It is to be noted that the processing order of the steps of each of the image encoding methods and the image decoding methods is an example for specifically explaining the present disclosure, and thus another processing order is possible. In addition, part of the steps may be executed at the same time (in parallel) when any of the other steps is executed.

It should be noted that although the image encoding apparatus and the image decoding apparatus according to one or more aspects of the present disclosure have been described above based on the exemplary embodiments, the present disclosure is not limited to the embodiments. Those skilled in the art will readily appreciate that many modifications are possible in the exemplary embodiments and other embodiments are possible by arbitrarily combining the structural elements of the embodiments without materially departing from the novel teachings and advantageous effects of the present disclosure. Accordingly, all of the modifications and other embodiments are intended to be included within the scope of the present disclosure.

Embodiment 7

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image encoding apparatus that includes an image encoding apparatus using the image encoding method and an image decoding apparatus using the image decoding method. Other configurations in the system can be changed as appropriate depending on the cases.

Figure 25:
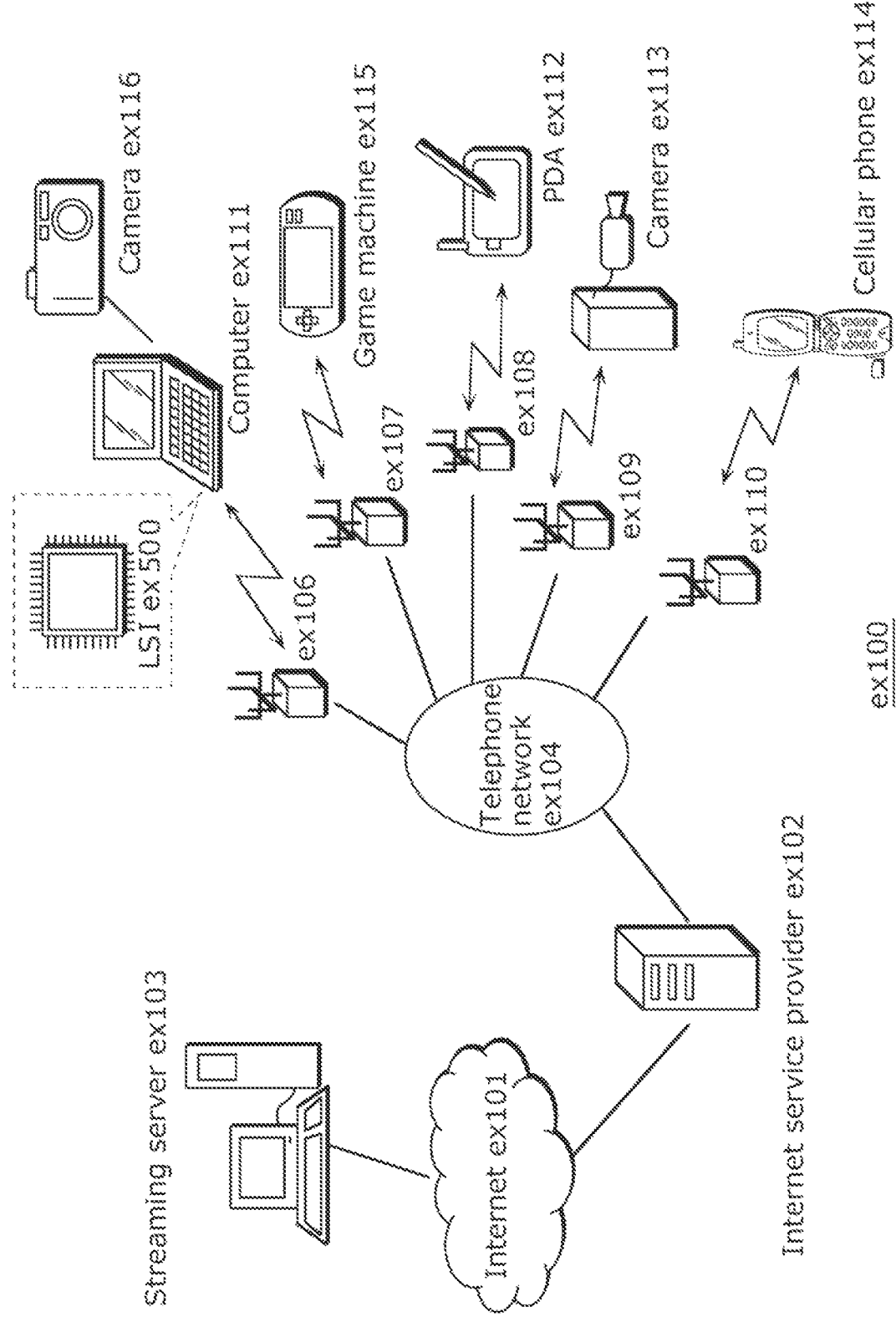
FIG. 25 shows an overall configuration of a content providing system for implementing content distribution services.

FIG. 25 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 25, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the encoding processes may be performed by an LSI ex500 generally included in each of the computer ex111 and the devices. The LSI ex500 may be configured of a single chip or a plurality of chips. Software for encoding video may be integrated into some type of a recording medium (such as a CD-ROM, a flexible disk, and a hard disk) that is readable by the computer ex111 and others, and the encoding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 26:
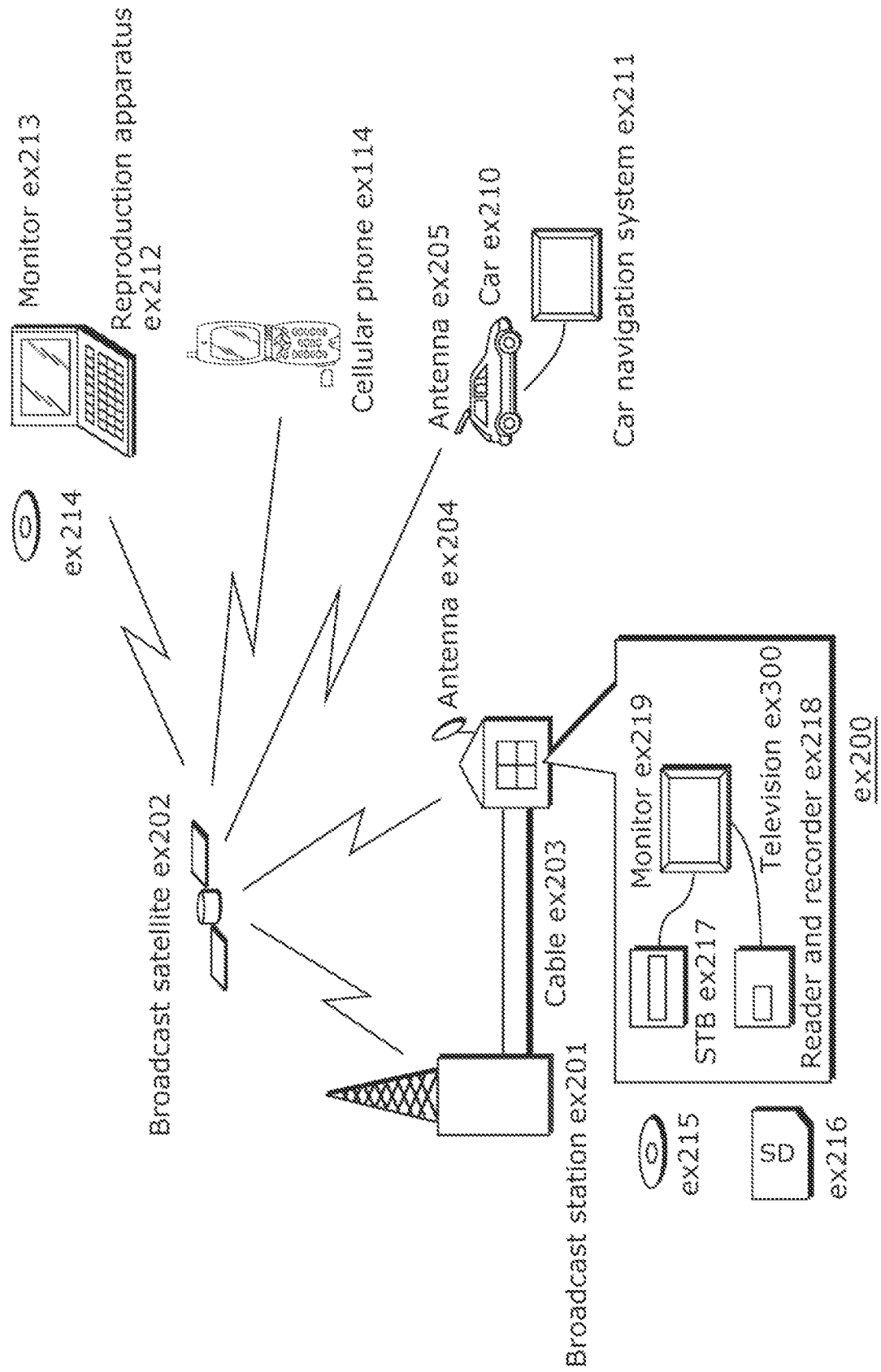
FIG. 26 shows an overall configuration of a digital broadcasting system.

Aside from the example of the content providing system ex100, at least one of the moving picture encoding apparatus (image encoding apparatus) described in each of embodiments may be implemented in a digital broadcasting system ex200 illustrated in FIG. 26. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 27:
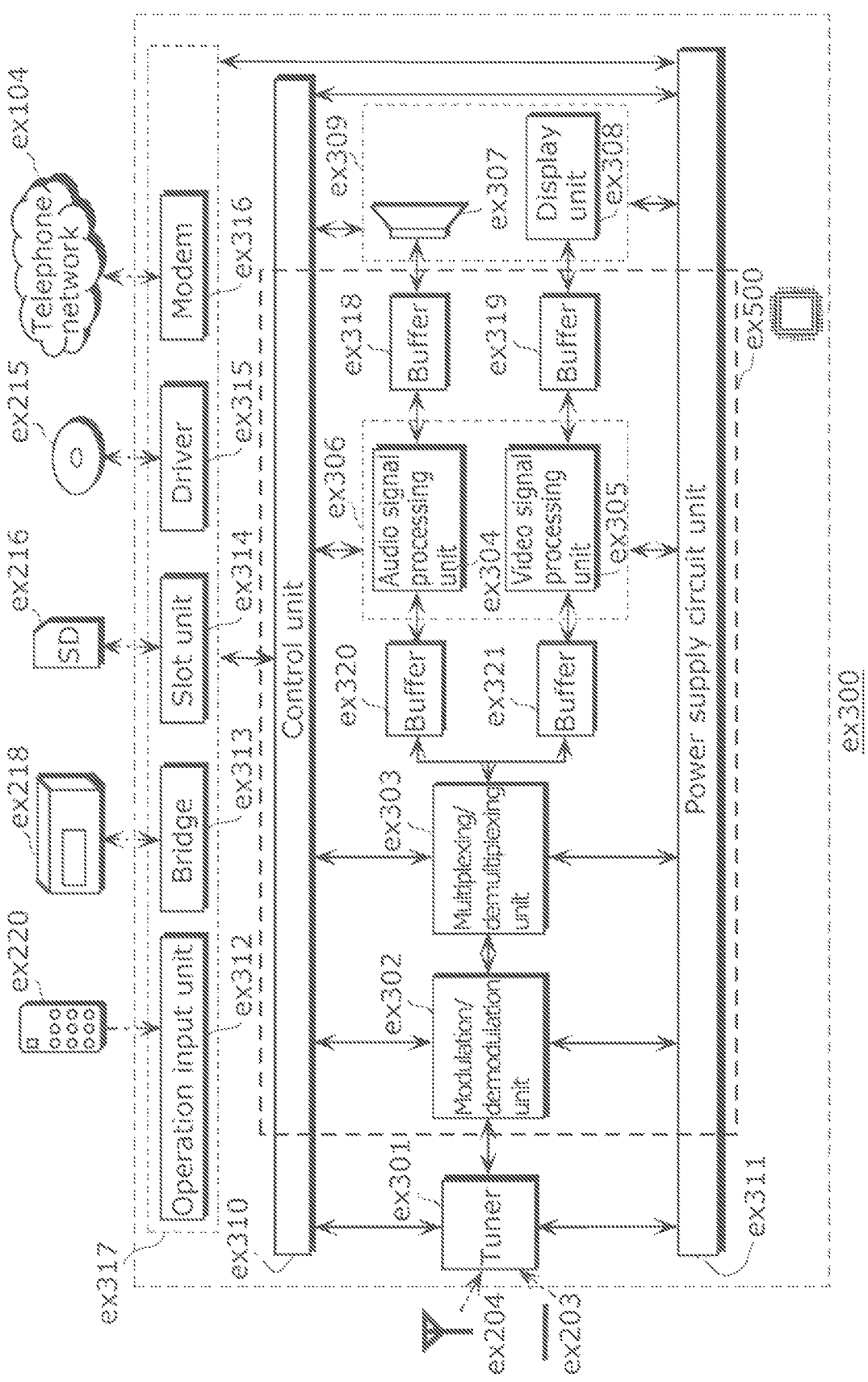
FIG. 27 shows a block diagram illustrating an example of a configuration of a television.

FIG. 27 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image encoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the encoding partly.

Figure 28:
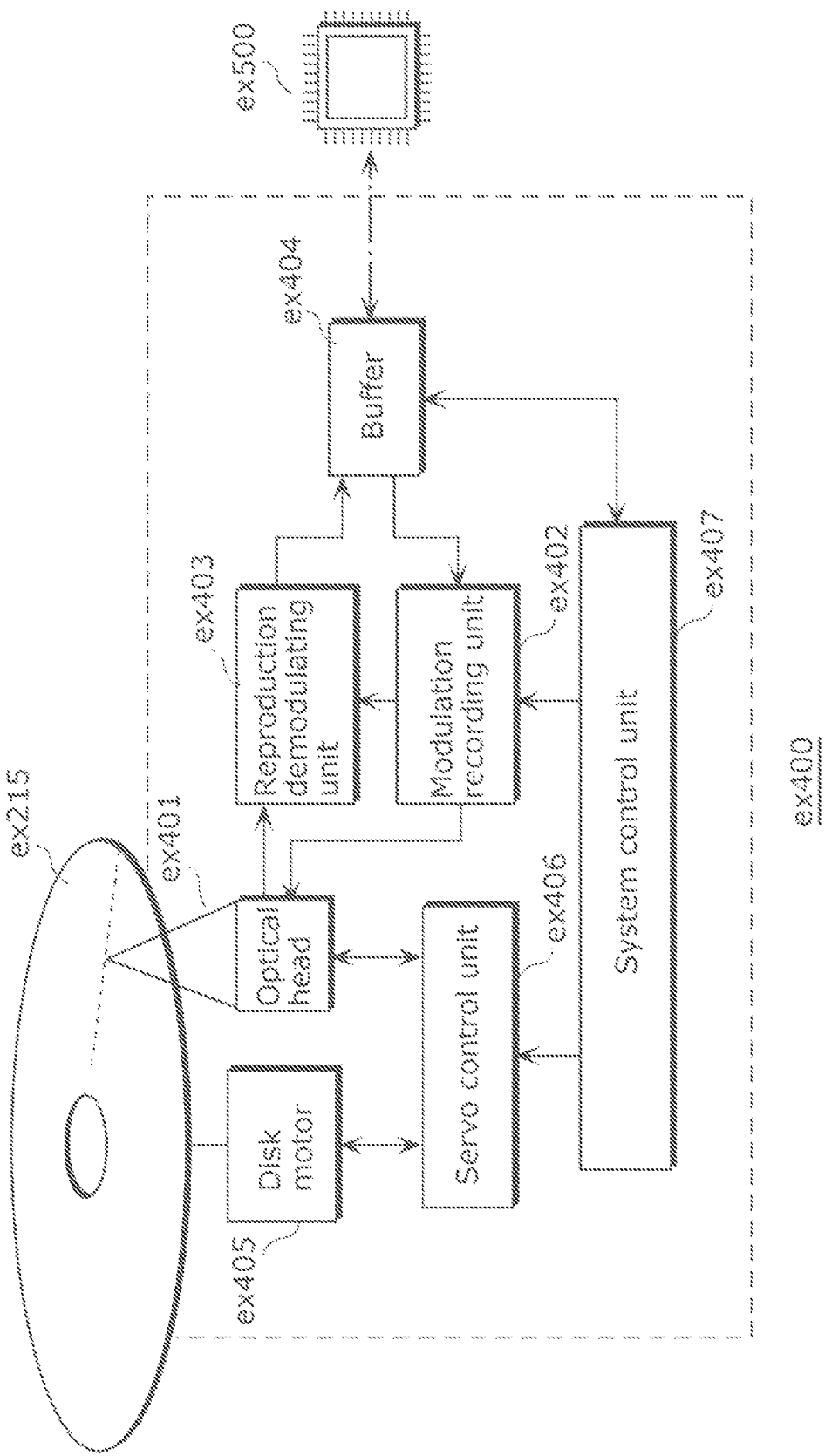
FIG. 28 shows a block diagram illustrating an example of a configuration of an information reproducing/recording unit that reads and writes information from and on a recording medium that is an optical disk.

As an example, FIG. 28 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 29:
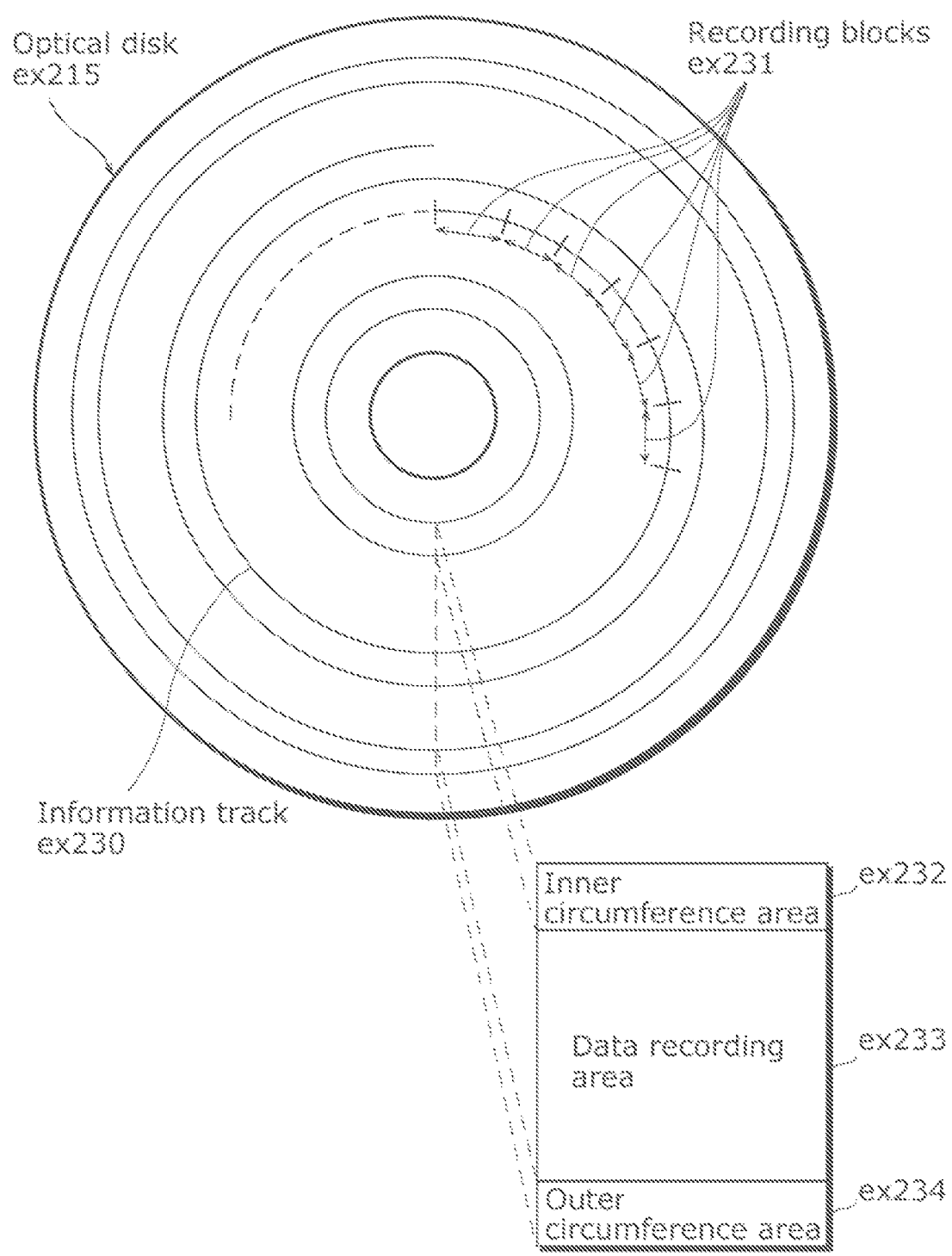
FIG. 29 shows an example of a configuration of a recording medium that is an optical disk.

FIG. 29 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 27. The same will be true for the configuration of the computer ex111, the cellular phone ex114, and others.

Figure 30A:
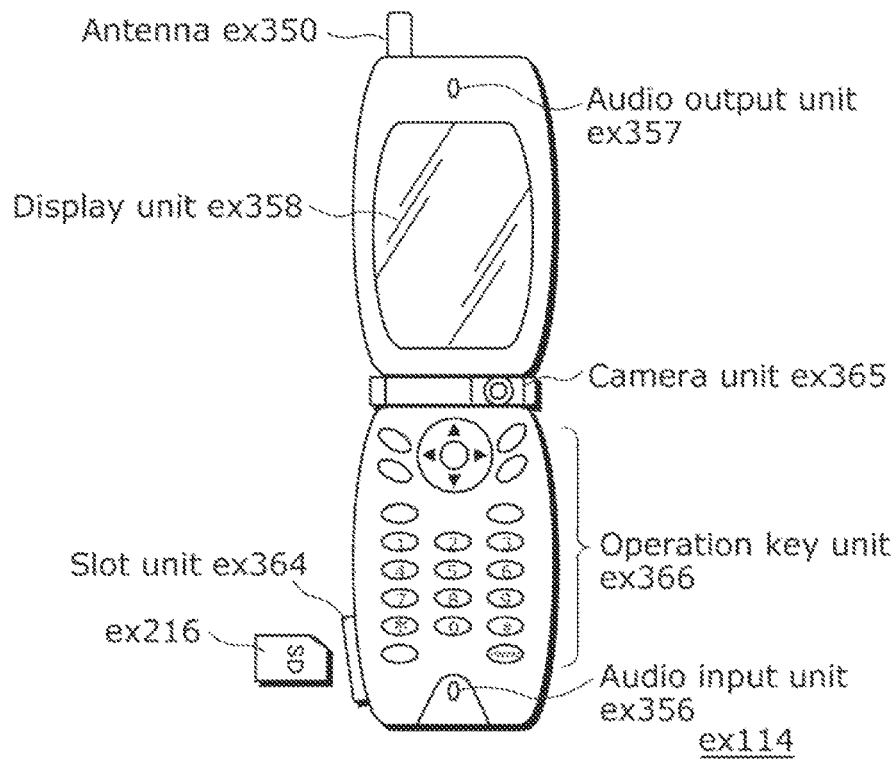
FIG. 30A shows an example of a cellular phone.

FIG. 30A illustrates the cellular phone ex114 that uses the moving picture encoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded data of the received video, the still pictures, e-mails, or others; and a slot unit ex364 that is an interface unit for a recording medium that stores data in the same manner as the memory unit ex367.

Figure 30B:
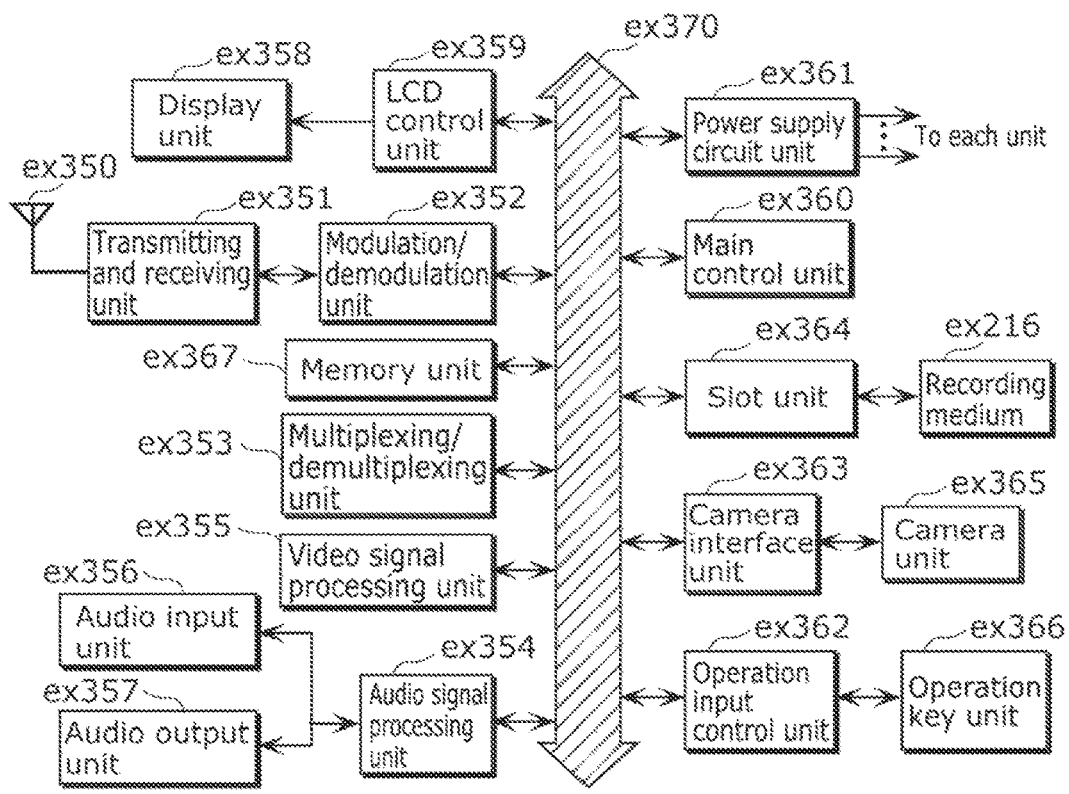
FIG. 30B is a block diagram showing an example of a configuration of a cellular phone.

Next, an example of a configuration of the cellular phone ex114 will be described with reference to FIG. 30B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture encoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 8

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 31 illustrates a structure of the multiplexed data. As illustrated in FIG. 31, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, to 0x121F are allocated to the presentation graphics streams, to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 32:
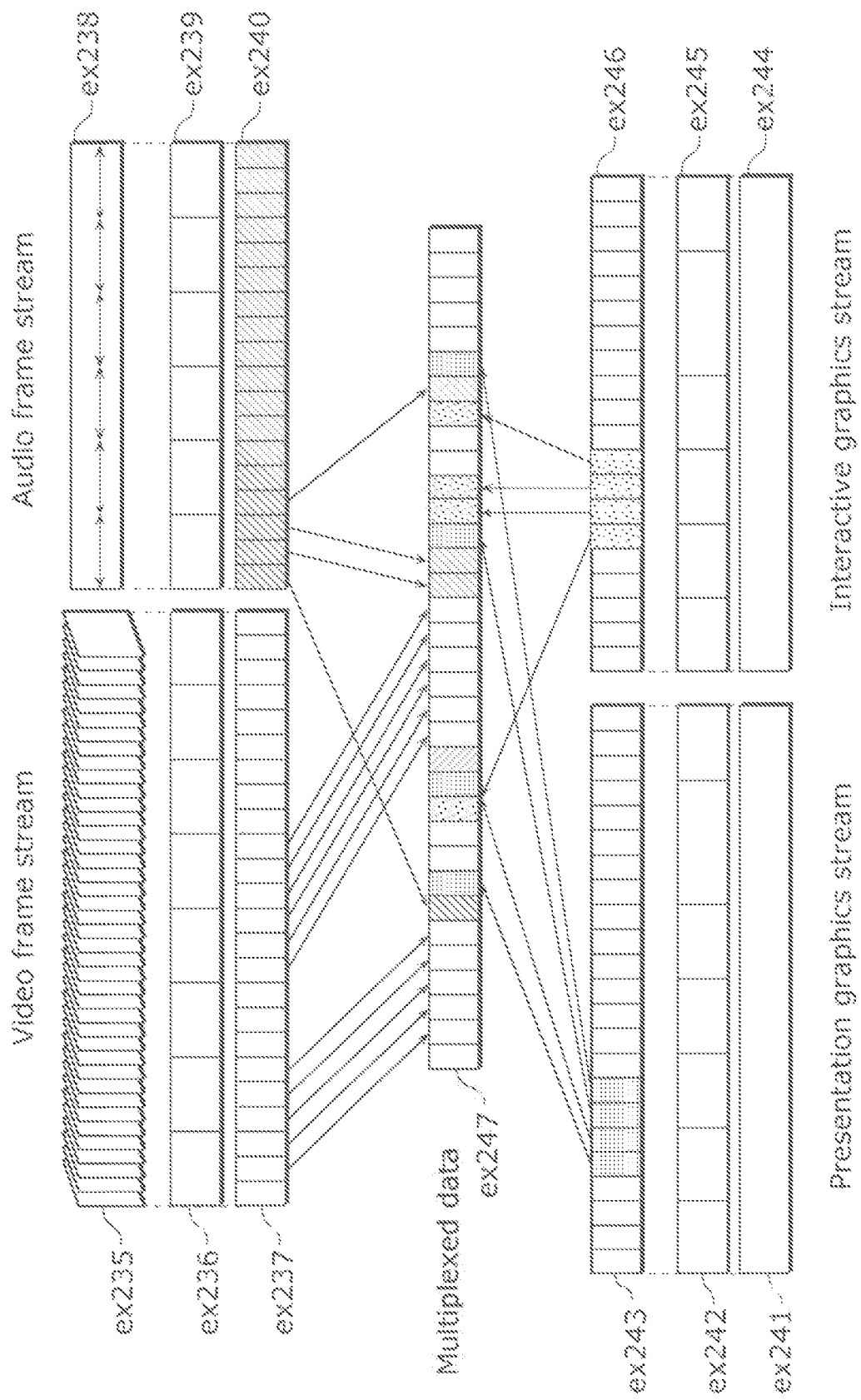
FIG. 32 schematically shows how each stream is multiplexed in multiplexed data.

FIG. 32 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 33:
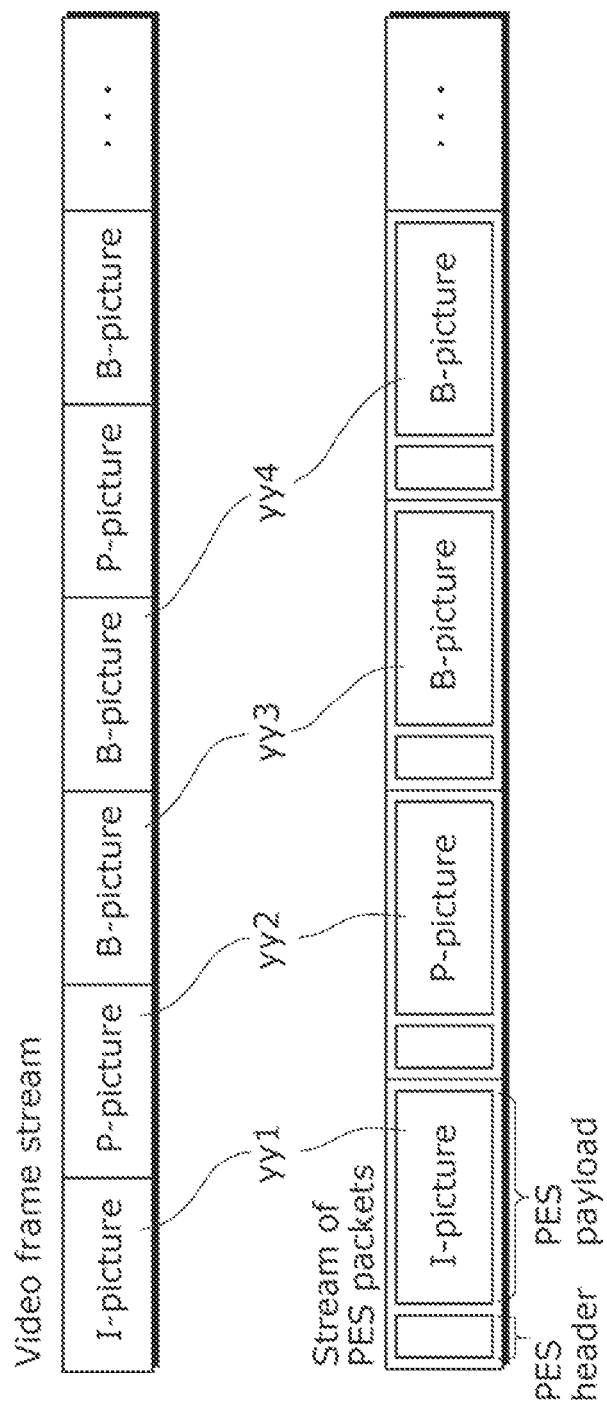
FIG. 33 shows how a video stream is stored in a stream of PES packets in more detail.

FIG. 33 illustrates how a video stream is stored in a stream of PES packets in more detail. The first bar in FIG. 33 shows a video frame stream in a video stream. The second bar shows the stream of PES packets. As indicated by arrows denoted as yy1, yy2, yy3, and yy4 in FIG. 33, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 34:
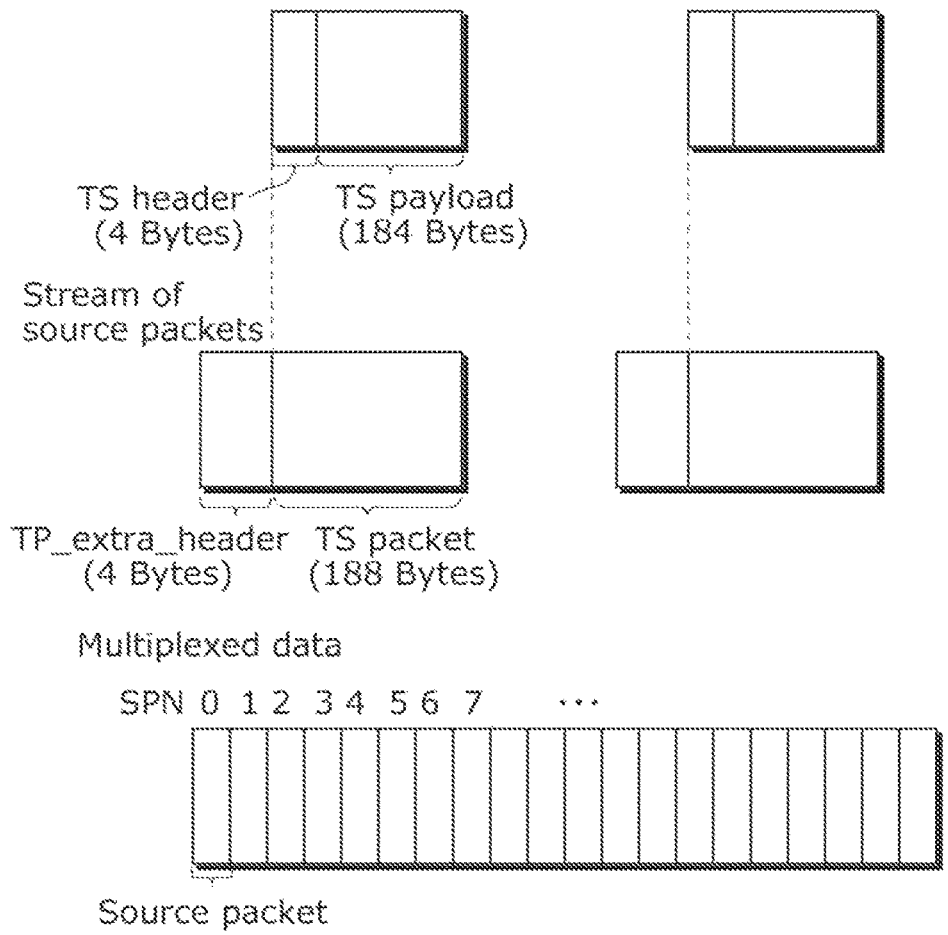
FIG. 34 shows a structure of TS packets and source packets in the multiplexed data.

FIG. 34 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 34. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 35:
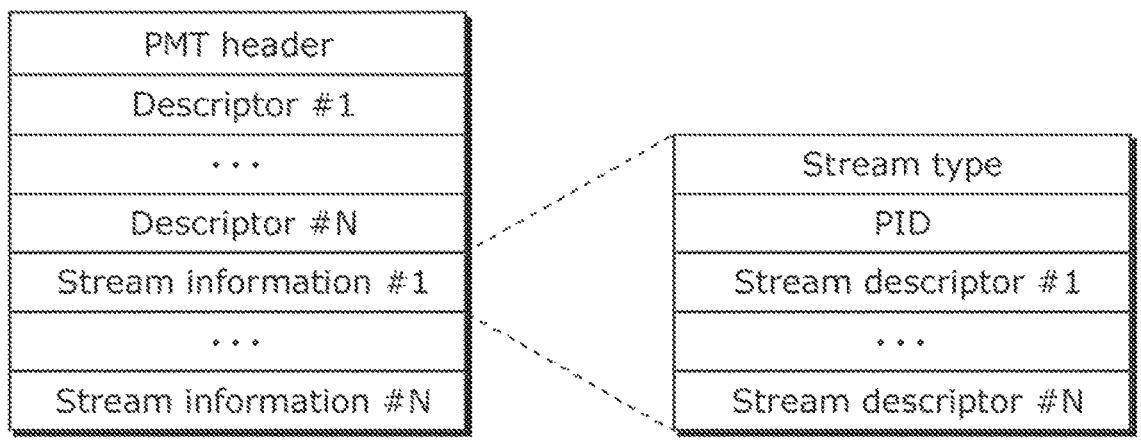
FIG. 35 shows a data structure of a PMT.

FIG. 35 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 36:
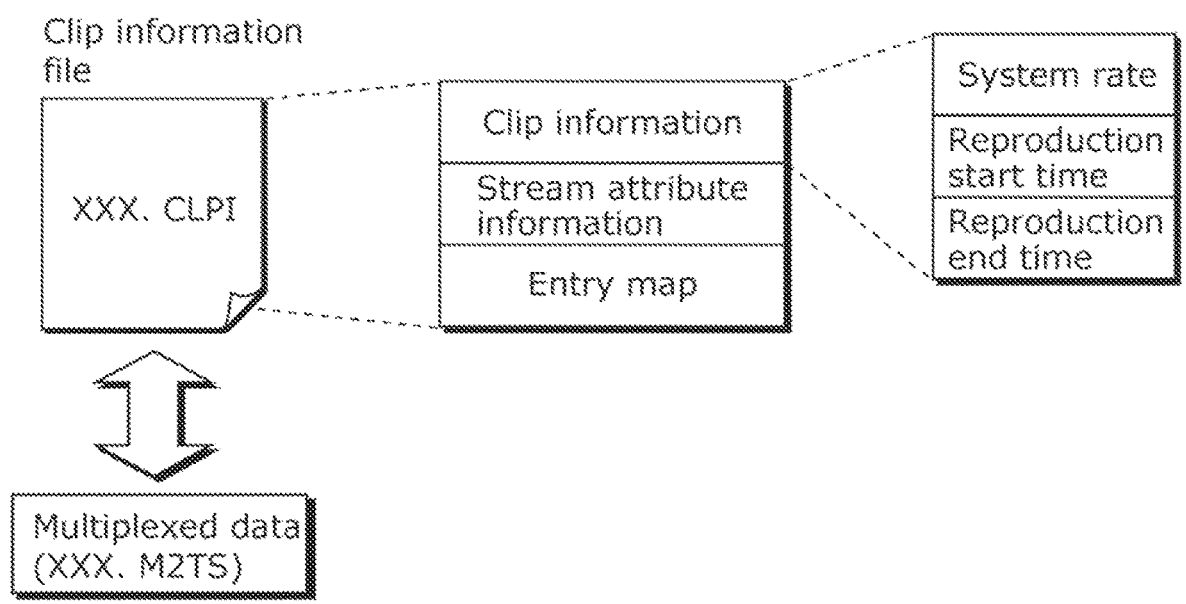
FIG. 36 shows an internal structure of multiplexed data information.

Each of the multiplexed data information files is management information of the multiplexed data as shown in FIG. 36. The multiplexed data information files are in one to one correspondence with the multiplexed data, and each of the files includes multiplexed data information, stream attribute information, and an entry map.

As illustrated in FIG. 36, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 37:
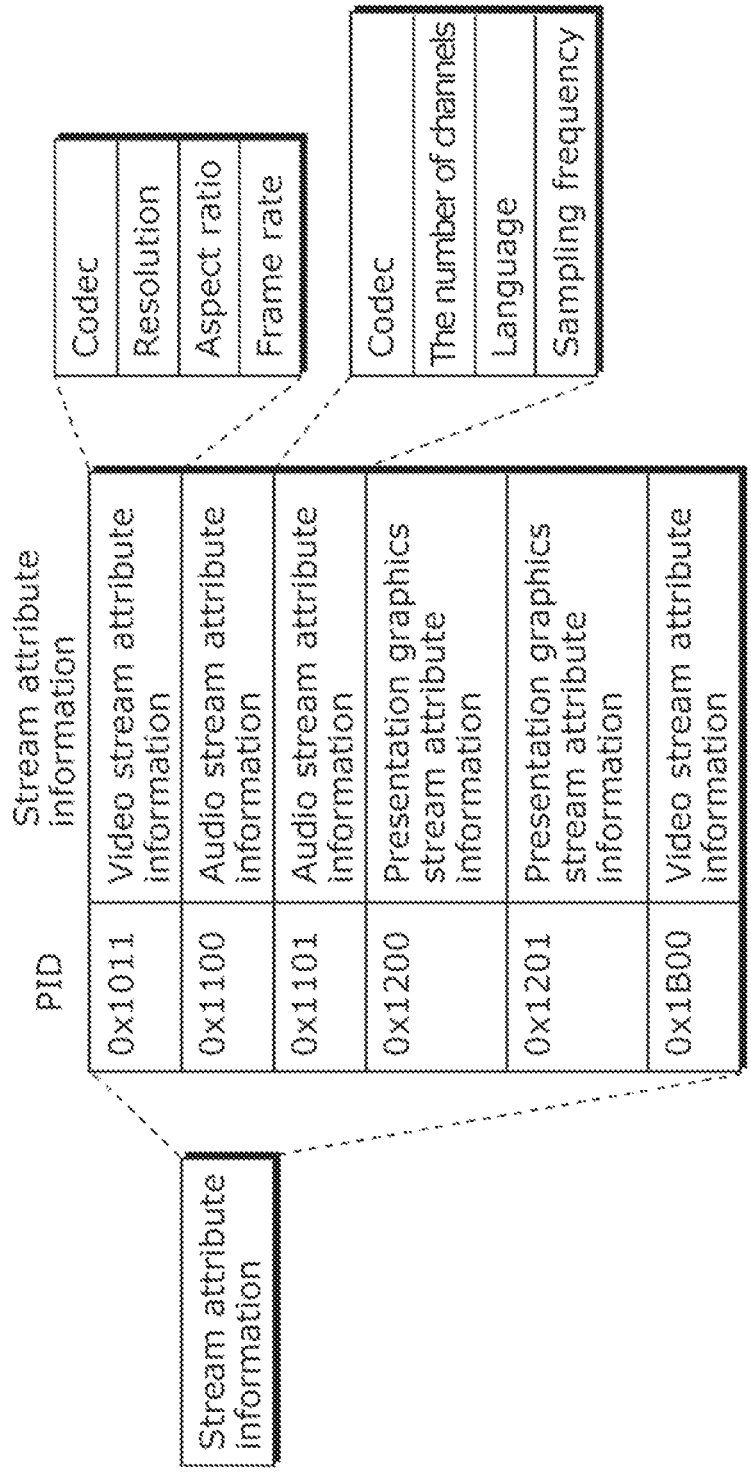
FIG. 37 shows an internal structure of stream attribute information.

As shown in FIG. 37, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 38:
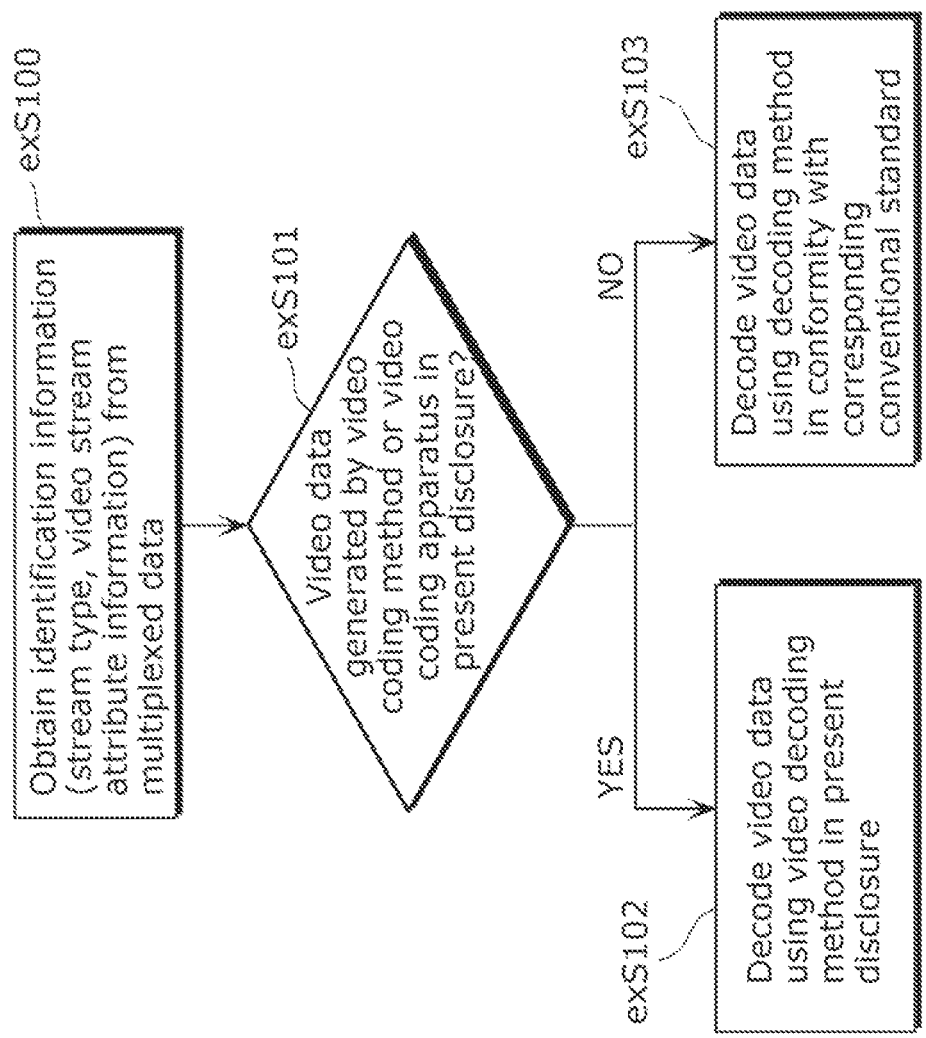
FIG. 38 shows steps for identifying video data.

Furthermore, FIG. 38 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 9

Figure 39:
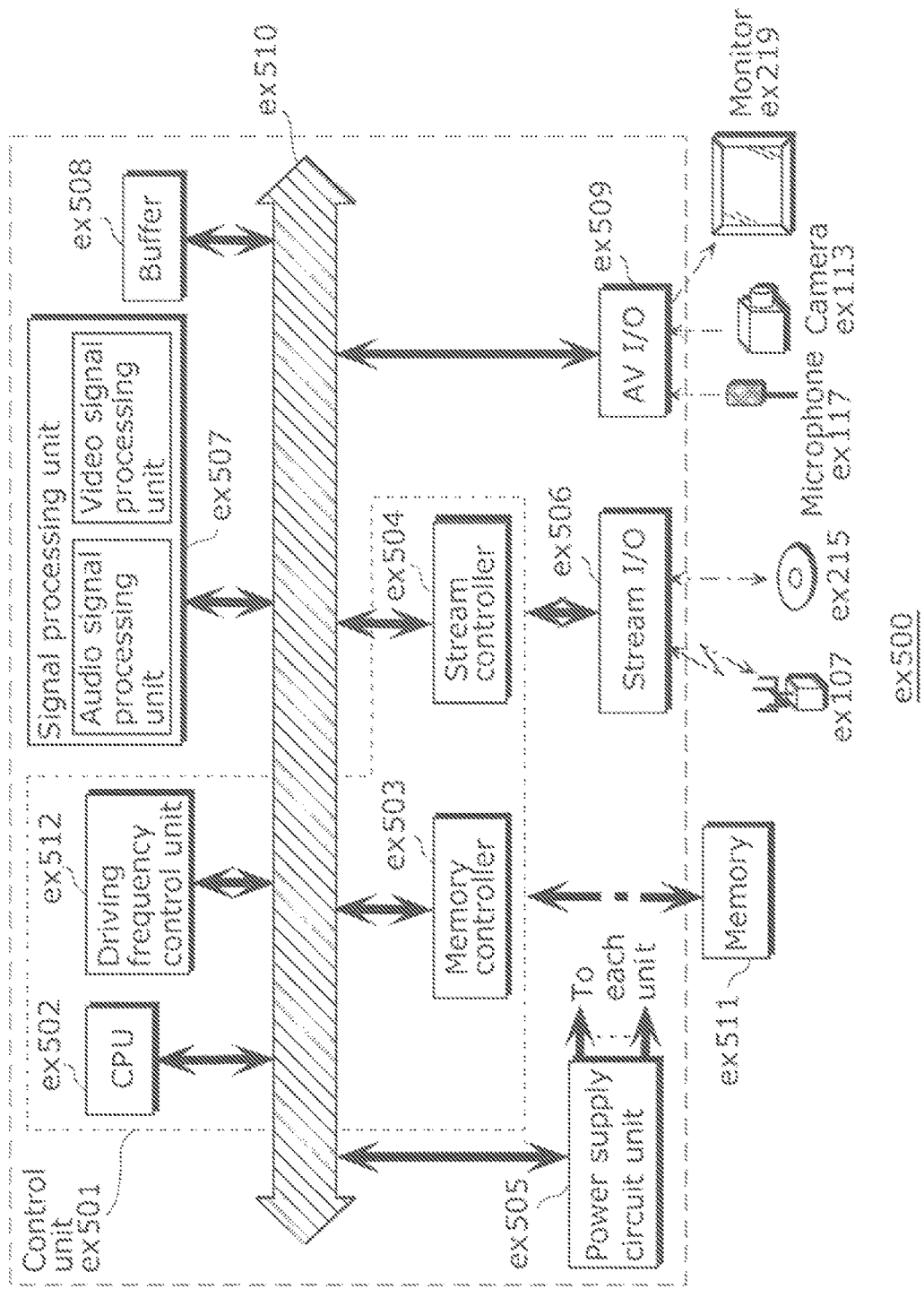
FIG. 39 shows an example of a configuration of an integrated circuit for implementing the moving picture encoding method according to each of embodiments.

Each of the moving picture encoding method and the moving picture encoding apparatus in each of embodiments is typically achieved in the form of an integrated circuit or a Large Scale Integrated (LSI) circuit. As an example of the LSI, FIG. 39 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture encoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 10

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. there is a problem that the power consumption increases.

Figure 40:
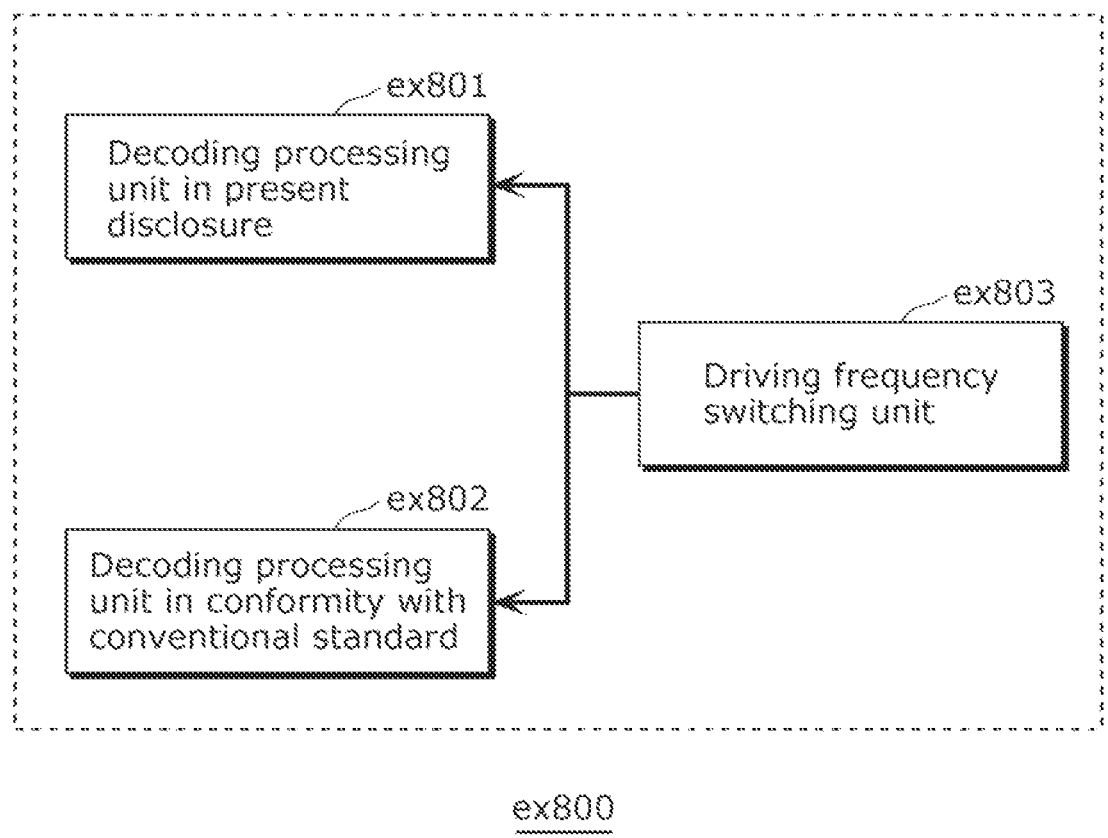
FIG. 40 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 40 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 39. Here, each of the decoding processing unit ex801 that executes the moving picture decoding method described in each of embodiments and the decoding processing unit ex802 that conforms to the conventional standard corresponds to the signal processing unit ex507 in FIG. 39. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 42. The driving frequency can be selected by storing the look-up table in the buffer ex508 and in an internal memory of an LSI, and with reference to the look-up table by the CPU ex502.

Figure 41:
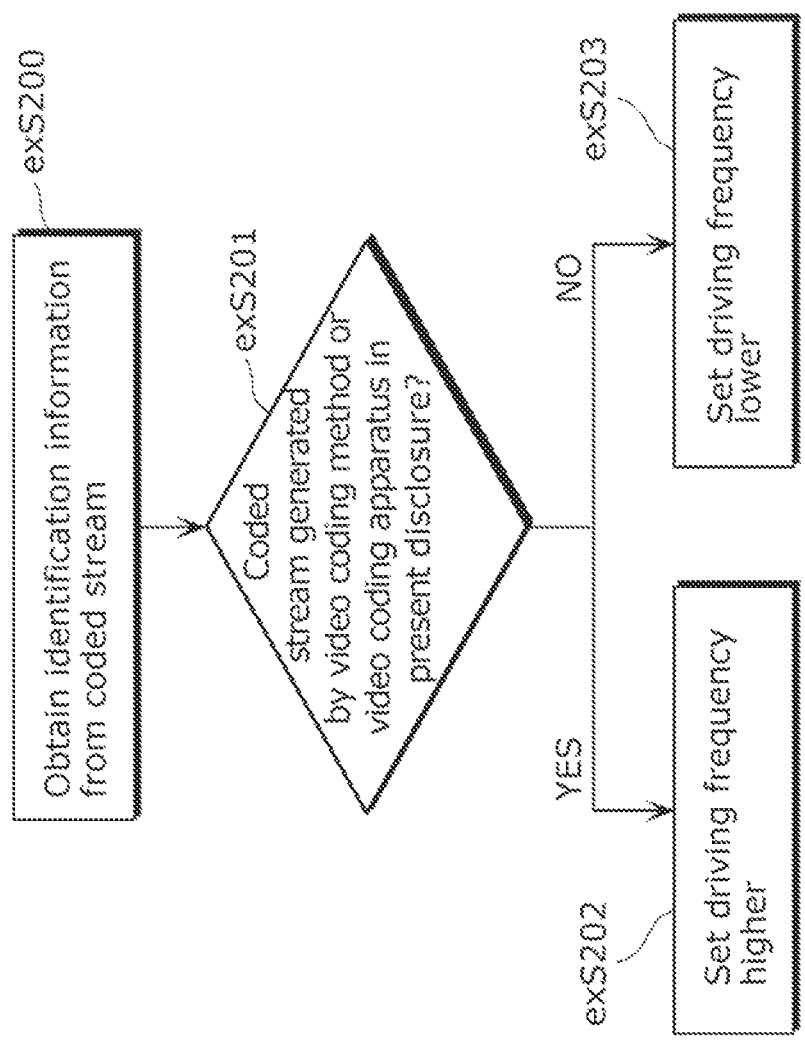
FIG. 41 shows steps for identifying video data and switching between driving frequencies.

FIG. 41 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 11

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 43A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 43B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image encoding method, the image decoding method, the image encoding apparatus, and the image decoding apparatus according to one or more exemplary embodiments disclosed herein are available in various applications such as data accumulation, transmission, communication, and so on. Specifically, the methods and apparatuses are applicable to information display apparatuses and imaging apparatuses such as television receivers, digital video recorders, car navigation systems, mobile phones, digital still cameras, and digital video cameras.

The invention claimed is:

1. A non-transitory computer readable medium storing therein a computer program, which when executed by a processor, causes the processor to perform operations including:
   obtaining tile constraint information included in a sequence parameter set, the sequence parameter set used in common for a plurality of pictures and the tile constraint information indicating whether or not there is a constraint uniformly in the plurality of pictures in filtering on tile boundaries between adjacent tiles among a plurality of tiles into which a picture is divided;
   obtaining filter information item among the plurality of filter information items from one of a plurality of picture parameter sets, each of the plurality of filter information items indicating whether or not the filtering is executed per an each picture basis;
   decoding the plurality of pictures;
   (i) when the tile constraint information indicates that there is constraint in the filtering, and the filter information item indicates that the filtering is executed, determining that the filtering is executed on all of the tile boundaries in the plurality of pictures;
   (ii) when the tile constraint information indicates that there is constraint in the filtering and the filter information item indicates that the filtering is not executed, determining the filtering is not executed on any of the tile boundaries in the plurality of pictures;
   (iii) when the tile constraint information indicates that there is not constraint in the filtering and the filter information item indicates that the filtering is executed, determining the filtering is executed in a picture which includes the obtained one of the plurality of picture parameter set; and (iv) when the tile constraint information indicates that there is not constraint in the filtering and the filter information item indicates that the filtering is not executed, determining the filtering is not executed in the picture, wherein the tiles are defined by HEVC standard.

2. A non-transitory computer readable medium storing therein a computer program, which when executed by a processor, causes the processor to perform operations including:
- determining whether a filtering is executed on all of tile boundaries between adjacent tiles among a plurality of tiles into which a picture is divided in a plurality of pictures or not;
- (i) when the filtering is determined to be executed on all of the tile boundaries,
  - coding a sequence parameter set including tile constraint information which indicates that there is constraint in the filtering, the sequence parameter set used in common for a plurality of pictures, and
  - coding one of a plurality of picture parameter sets including filter information item which indicates that the filtering is executed per a picture basis;
- (ii) when the filtering is not executed on any of the tile boundaries in the plurality of pictures,
  - coding the sequence parameter set including the tile constraint information which indicates that there is constraint in the filtering,
  - coding the one of the plurality of picture parameter sets including the filter information item which indicates that the filtering is not executed, and
  - determining whether the filtering is executed on the all of the tile boundaries in a particular picture or not on a picture basis;
- (iii) when the filtering is executed in the particular picture,
  - coding the sequence parameter set including the tile constraint information which indicates that there is not constraint in the filtering,
  - coding the one of the plurality of picture parameter sets including the filter information item which indicates that the filtering is executed, and
  - setting the one of the plurality of picture parameter sets in the particular picture; and
- (iv) when the filtering is not executed in the particular picture,
  - coding the sequence parameter set including the tile constraint information which indicates that there is not constraint in the filtering,
  - coding the one of the plurality of picture parameter sets including the filter information item which indicates that the filtering is not executed, and
  - setting the one of the plurality of picture parameter sets in the particular picture, wherein the tiles are defined by HEVC standard.

* * * * *